(12) United States Patent
Lotito

(10) Patent No.: US 9,906,892 B2
(45) Date of Patent: Feb. 27, 2018

(54) SHORT RANGE WIRELESS COMMUNICATION SYSTEM COMPRISING A SHORT RANGE WIRELESS COMMUNICATION SENSOR AND A MOBILE TERMINAL HAVING IMPROVED FUNCTIONALITY AND METHOD

(71) Applicant: ISTITUTO SUPERIORE MARIO BOELLA SULLE TECNOLOGIE, Turin (IT)

(72) Inventor: Antonio Lotito, Gassino Torinese (IT)

(73) Assignee: S.I.SV .EL. SOCIETÁ ITALIANA PER LO SVILUPPO DELL 'ELETTRONICA S.P.A. (IT)

( * ) Notice: Subject to any disclaimer, the term of this patent is extended or adjusted under 35 U.S.C. 154(b) by 0 days.

(21) Appl. No.: 14/649,804

(22) PCT Filed: Dec. 12, 2013

(86) PCT No.: PCT/IB2013/060850
§ 371 (c)(1),
(2) Date: Jun. 4, 2015

(87) PCT Pub. No.: WO2014/091441
PCT Pub. Date: Jun. 19, 2014

(65) Prior Publication Data
US 2015/0304804 A1    Oct. 22, 2015

(30) Foreign Application Priority Data
Dec. 13, 2012   (IT) .............................. TO2012A1070

(51) Int. Cl.
*H04W 4/00* (2009.01)
*G06F 3/01* (2006.01)
(Continued)

(52) U.S. Cl.
CPC ............ *H04W 4/008* (2013.01); *G06F 3/017* (2013.01); *H04M 1/7253* (2013.01); *H04W 4/025* (2013.01); *G06F 2200/1637* (2013.01)

(58) Field of Classification Search
None
See application file for complete search history.

(56) References Cited

U.S. PATENT DOCUMENTS

| 2003/0160681 A1 * | 8/2003 | Menard ................... E05B 45/06 340/5.64 |
| 2004/0002305 A1 | 1/2004 | Byman-Kivivuori et al. |

(Continued)

FOREIGN PATENT DOCUMENTS

| CN | 1662920 A | 8/2005 |
| JP | H06-161652 | 6/1994 |

(Continued)

OTHER PUBLICATIONS

Italian Search Report dated Jun. 4, 2013, issued in Italian Application No. TO20121070, filed Dec. 13, 2012.

(Continued)

*Primary Examiner* — Alejandro Rivero
(74) *Attorney, Agent, or Firm* — Workman Nydegger

(57) ABSTRACT

A short range wireless communication system (10) includes a short range wireless communication sensor (1,5) and a mobile terminal (3) adapted to interact with the short range wireless communication sensor (1,5), wherein such a mobile terminal (3) includes a detector (31) adapted to detect at least a movement of the mobile terminal (3) following the interaction with the short range wireless communication sensor (1,5) and wherein the mobile terminal (3) comprises a controller (39), particularly a microprocessor, adapted to (Continued)

control at least an operation based on such movement and the interaction with the short range wireless communication sensor (1,5).

19 Claims, 22 Drawing Sheets

(51) Int. Cl.
*H04M 1/725* (2006.01)
*H04W 4/02* (2018.01)

(56) References Cited

U.S. PATENT DOCUMENTS

| | | | |
|---|---|---|---|
| 2008/0014989 A1* | 1/2008 | Sandegard | G06F 1/1626 |
| | | | 455/557 |
| 2011/0095873 A1 | 4/2011 | Pratt et al. | |
| 2012/0021684 A1 | 1/2012 | Schultz et al. | |
| 2012/0190301 A1 | 7/2012 | Hart | |
| 2012/0280783 A1* | 11/2012 | Gerhardt | G07C 9/00309 |
| | | | 340/5.6 |
| 2012/0302292 A1 | 11/2012 | Hangai | |
| 2014/0082501 A1 | 3/2014 | Bae et al. | |
| 2014/0220886 A1* | 8/2014 | Adrangi | H04W 52/0229 |
| | | | 455/41.1 |
| 2014/0357189 A1* | 12/2014 | Thuroe | H04M 1/7253 |
| | | | 455/41.1 |

FOREIGN PATENT DOCUMENTS

| | | |
|---|---|---|
| JP | 2009-206663 A | 9/2009 |
| JP | 2011-63961 A | 3/2011 |
| JP | 2011-139311 A | 7/2011 |
| JP | 2011-150622 A | 8/2011 |
| JP | 2012-521685 A | 9/2012 |
| JP | 2014-64278 A | 4/2014 |
| JP | 2015-513830 A | 5/2015 |
| WO | 2010/108235 A1 | 9/2010 |
| WO | 2011/103684 A1 | 9/2011 |
| WO | 2013/123469 A1 | 8/2013 |

OTHER PUBLICATIONS

International Search Report dated Mar. 6, 2014, issued in PCT Application No. PCT/IB2013/060850, filed Dec. 12, 2013.
Japanese Office Action dated Dec. 26, 2017, issued in Japanese No. JP2015/547242.

* cited by examiner

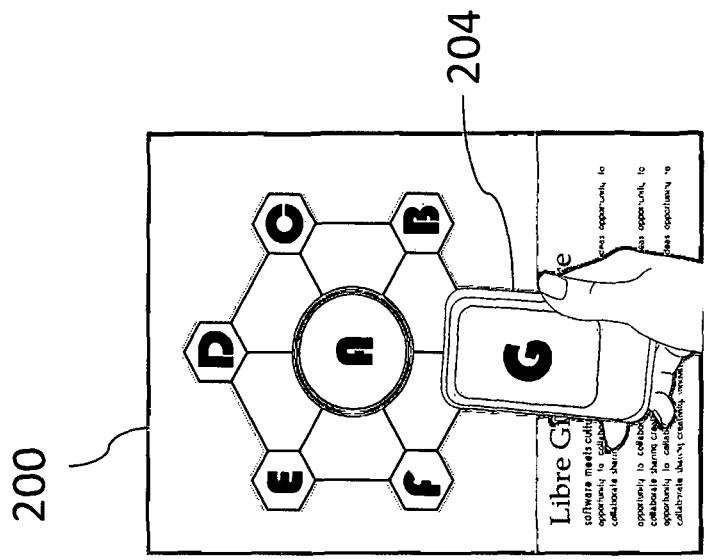
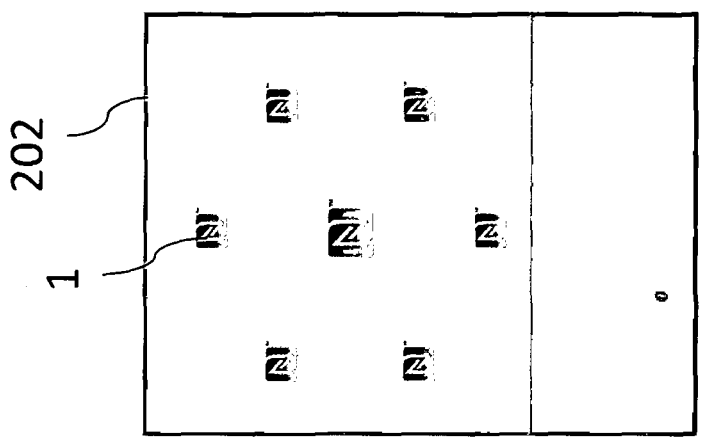
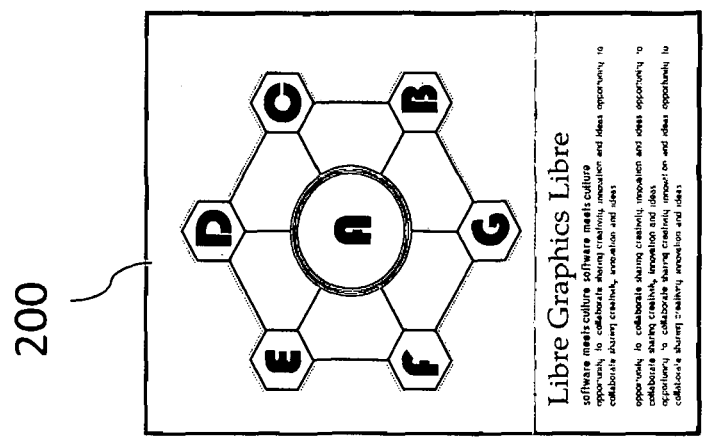
Fig. 2c
Fig. 2b
Fig. 2a

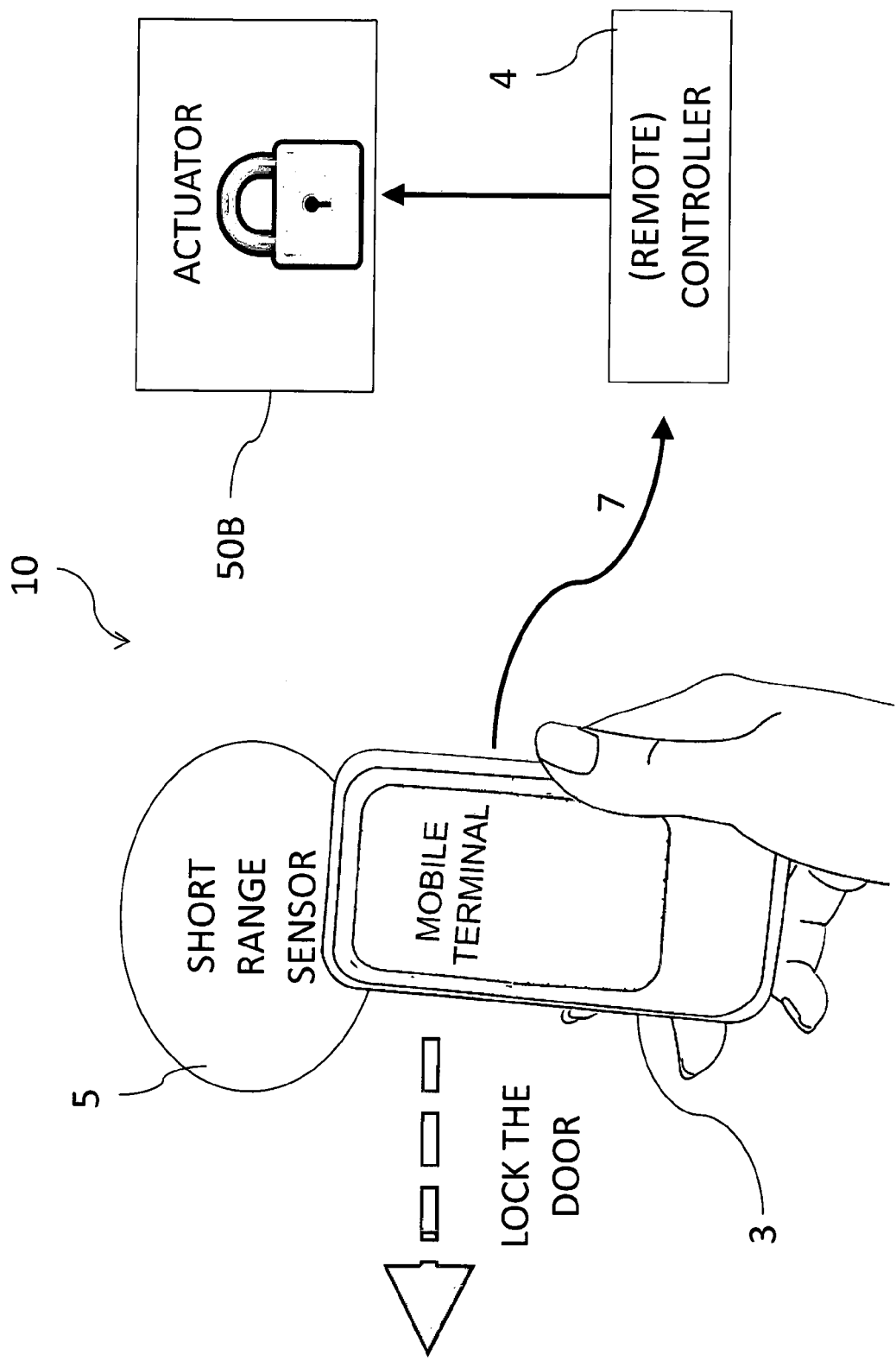

SHORT RANGE WIRELESS COMMUNICATION SYSTEM COMPRISING A SHORT RANGE WIRELESS COMMUNICATION SENSOR AND A MOBILE TERMINAL HAVING IMPROVED FUNCTIONALITY AND METHOD

BACKGROUND OF THE INVENTION

1. Field of the Invention

The present invention refers to a short range wireless communication system, particularly a NFC communication ("Near Field Communication"), comprising a short range wireless communication sensor and a mobile terminal having improved features, and relating method.

2. Present State of the Art

It is known that short range communication technology, in particular the one relating to NFC, essentially provides three modes of operation:

"Reader-Writer": it is the most classic and common mode of use. Thanks to this mode an NFC reader is able to read the contents from a memory contained in a NFC label (or "tag"). Gestures carried out in this mode are limited to the so-called "tap". By means of this gesture, in fact, a user is taken to approach (almost touching) an NFC device (for example, a "smartphone" or a generic mobile terminal 3 equipped with NFC hardware and firmware) to a NFC tag 1 to read its content, as shown in FIG. 1.

"Card Emulation": thanks to this mode, an NFC device is able to operate as a common label NFC. This mode is particularly used in electronic payment settings ("Payment" and "Ticketing").

"Peer-To-Peer": it is the operating mode that allows two devices, equipped with an NFC circuit, to exchange data through the introduction of a bidirectional communication channel.

In the state of the art the so-called "Smart Poster" are also well-known, i.e., posters, often in paper form, behind which one or more NFC 1 labels are positioned and attached. Each NFC label 1, read by a mobile terminal 3 equipped with NFC circuit, corresponds to a different operation, or even function.

To date, in any field, each NFC label 1 relates to a very precise single operation and it is independent from the others. In FIG. 2a, it is shown a front view of an exemplar "Smart Poster" 200, in FIG. 2b it is shown the rear side 202 with a visualization of NFC tags 1 and in FIG. 2c it is depicted a possible interaction between a smartphone 204 and a "Smart Poster" 200.

Additionally, in the state of the art the interaction between an NFC device and NFC sensors through gestures called "SLIDE" (or "SWIPE") is known. This interaction, from a manufacturing point of view, is implemented using a plurality of NFC sensors and assuming that each sensor represents a very specific operation.

With reference to FIGS. 3a and 3b, for example, an "open the door" feature may be associated to a first NFC sensor 1 and, a "close the door" feature to a second NFC sensor 2. Thus, with two NFC sensors 1 and 2 it may be possible to perform actions of door opening and closing, using a mobile terminal 3 and a controller 4, the latter being able, effectively, to convert commands into operations.

In this regard, the patent document WO 2011/103684 describes a system comprising a plurality of NFC sensors, a mobile terminal with NFC circuit and a processor. The described method describes the possibility of moving the mobile terminal in proximity to said plurality of NFC sensors and, by means of the configured in an appropriate way controller, it is possible to perform various operations, based on time and sequence in which sensors are read by the NFC mobile terminal.

However, such system and method does not allow obtaining a high usability and immediacy of operations, since the mobile terminal must necessarily communicate with at least two NFC sensors to obtain the execution of a predefined operation. In addition, each label NFC provides only a single function and it is activated solely through the "tap" gesture; it is therefore necessary to add an NFC sensor for each operation, which increases installation costs and time as well as the necessary area to implement such method and system.

In the state of the art, there are therefore no solutions able to provide for user's gestures, and then for the mobile device, different from the simple "tap". At the moment, in fact, more complex gestures are not taken into account, with reference to a single NFC label. More complex gestures, known in the state of the art, refer, for example, to tactile type screens ("touch-screen displays"). Originally, tactile type screens were just able to handle individual commands ("single touch-screen"); at a later time the limiting character of this operation was rated, and multiple touch screens were introduced ("multi-touch displays") and, various gestures were therefore introduced that can revolutionize the way users interact with their screen, that is through the terminal. For example, in FIG. 4 a few gestures known in the art are given.

On the other hand, with reference to short range wireless communications, all possible interactions between the mobile terminal and short range sensor mode take place exclusively through the single touch mode ("single touch" or "tap"), as shown in FIG. 5, which shows some typical use cases 500, 502, 504 related to the NFC communication. In the use case 500 a user makes a "tap" gesture with his smartphone on the NFC label and receives from the NFC label a web address (the Facebook page of the company) to which the smartphone connects to read the company offers. The use case 502 is similar to the one just described, and the use case 504 provides that a user operates a "tap" gesture with his smartphone on the NFC label, so that the NFC label sends to the smartphone information to start an application on the smartphone, in this case Twitter.

SUMMARY OF THE INVENTION

It is therefore an object of the present invention to disclose a short range wireless communication system and method, particularly an NFC communication, comprising a short range communication sensor and a mobile terminal having improved features, which allow improving the usability of a user terminal.

A second object of the present invention is to disclose a short range wireless communication system and method, particularly an NFC communication, comprising a short range communication sensor and a mobile terminal having improved features, that allow to make operation control more natural for a user.

A third object of the present invention is to disclose a short range wireless communication system and method, particularly an NFC communication, comprising a short range communication sensor and a mobile terminal having improved features, which allow a user to execute such short range wireless communication in a simple and low cost way.

A further object of the present invention is to disclose a short range wireless communication system and method, particularly an NFC communication, comprising a short range communication sensor and a mobile terminal having improved features, which allow a user to extend the gestures range with his mobile terminal so as to perform a plurality of operations, without increasing the number of NFC sensors or mobile terminals which are necessary to execute them.

All commands related to a certain device to operate may be given through a single mobile terminal and a single NFC sensor with considerable resource savings during system installation and maintenance.

These and other objects of the invention are achieved by means of a short range wireless communication system and method, particularly an NFC communication, comprising a short range communication sensor and a mobile terminal having improved features, as claimed in the appended claims forming an integral part of the present description.

In short, it is herein described a short range wireless communication system comprising a short range wireless communication sensor and a mobile terminal adapted to interact with the short range wireless communication sensor, in which said mobile terminal comprises detection means adapted to detect at least a mobile terminal movement upon interaction with short range wireless communication sensor, and wherein the mobile terminal comprises control means, particularly a microprocessor, adapted to control at least one operation on the basis of said movement and interaction with the short range wireless communication sensor.

Further features of the invention are the subject matter of the enclosed claims intending to be integral part of the present specification.

BRIEF DESCRIPTION OF THE DRAWINGS

The above mentioned objects will appear clearer from the detailed description of a short range wireless communication system and method, particularly an NFC communication, comprising a short range communication sensor and a mobile terminal having improved features, according to the present invention, with particular reference to the enclosed Figures, wherein:

FIGS. 2a, 2b and 2c show a "Smart Poster" known in the state of the art;

FIGS. 17a, 17b, 17c, 17d depict four possible gestures and relating operations of an exemplary embodiment according to the present invention;

DETAILED DESCRIPTION OF THE PREFERRED EMBODIMENTS

In a first embodiment of the present invention, short range communication is a NFC communication that employs the "Reader-Writer" mode.

Figure 1:
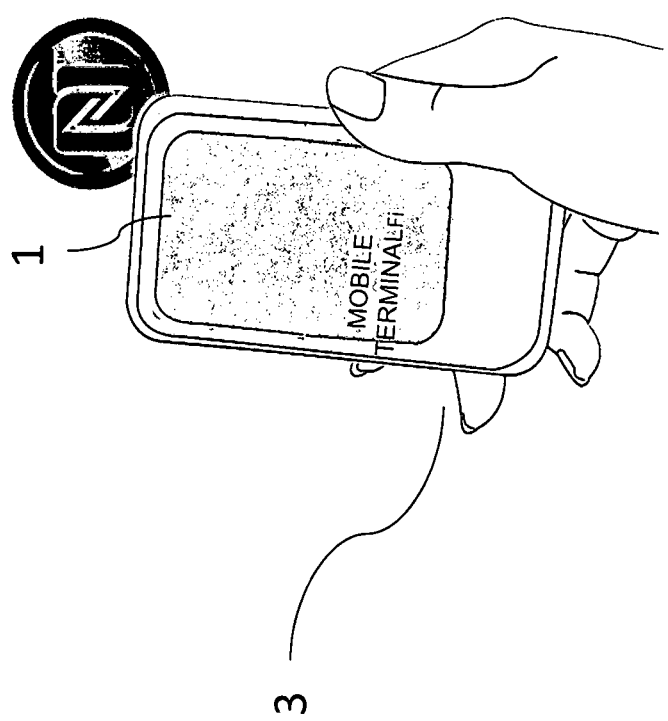
FIG. 1 depicts the "tap" gestures on an NFC sensor.
Figure 3A:
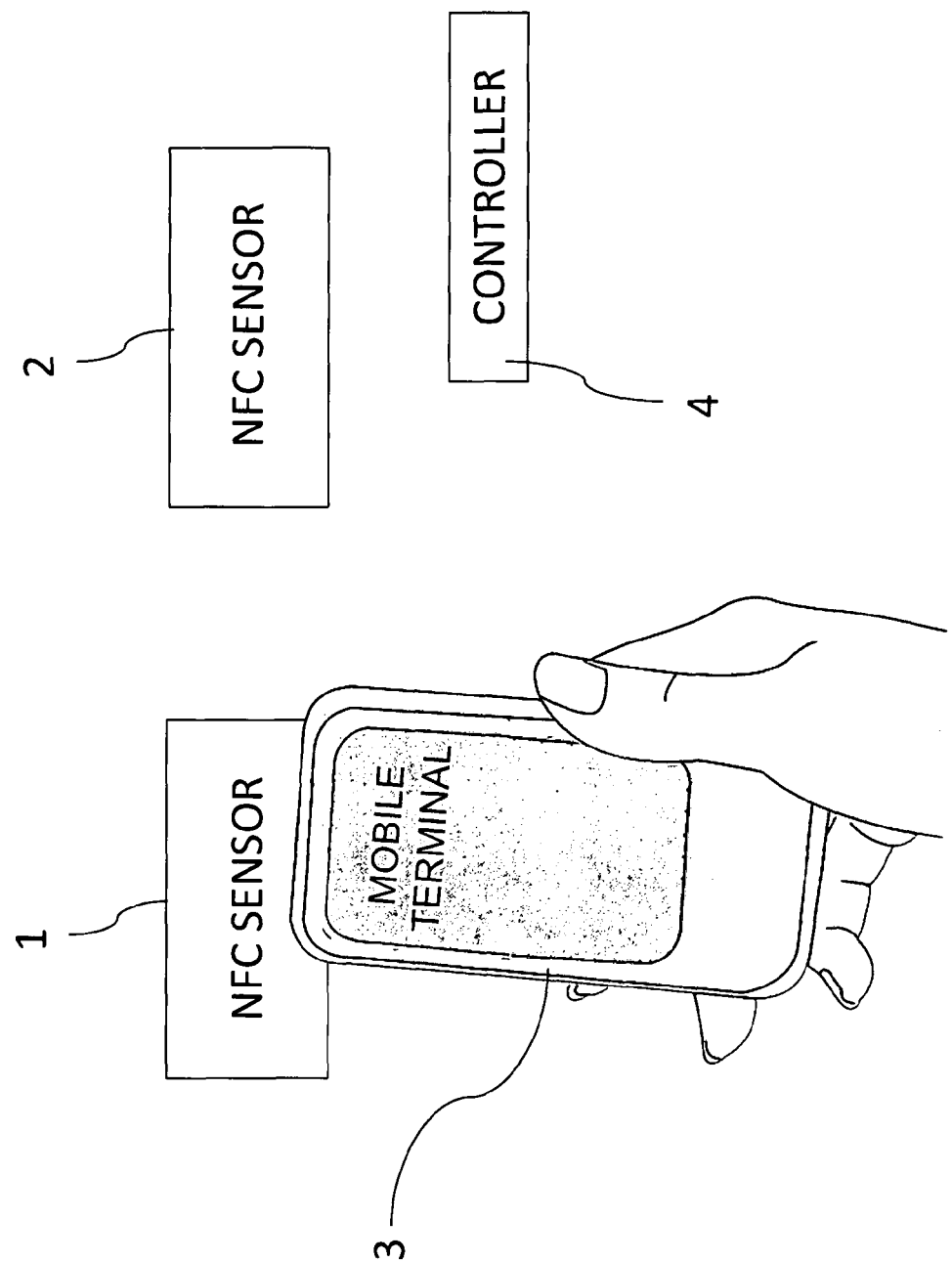
FIGS. 3a and 3b depict an example of interaction between a mobile terminal and several NFC sensors known in the art.
Figure 3B:
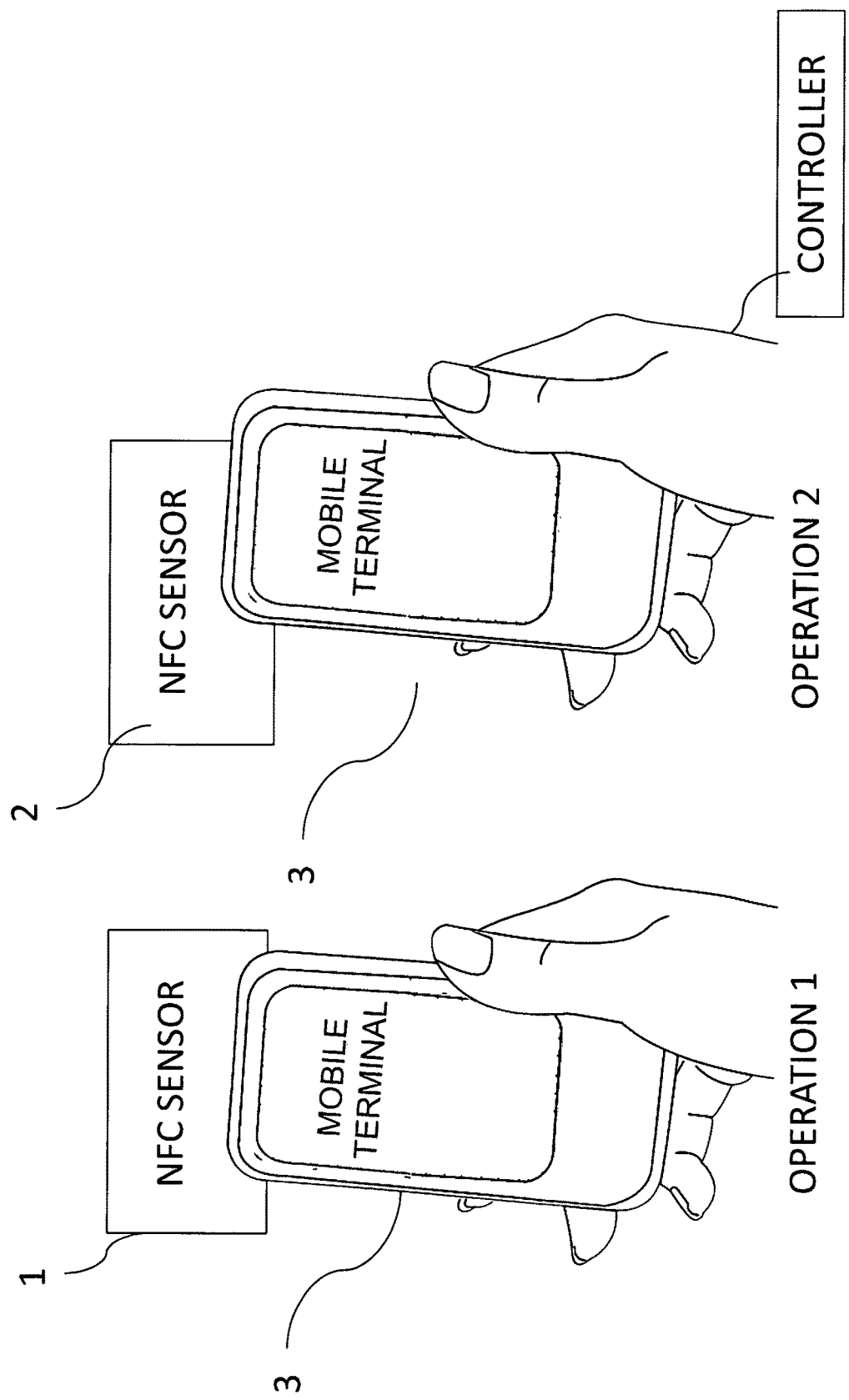
Figure 4:
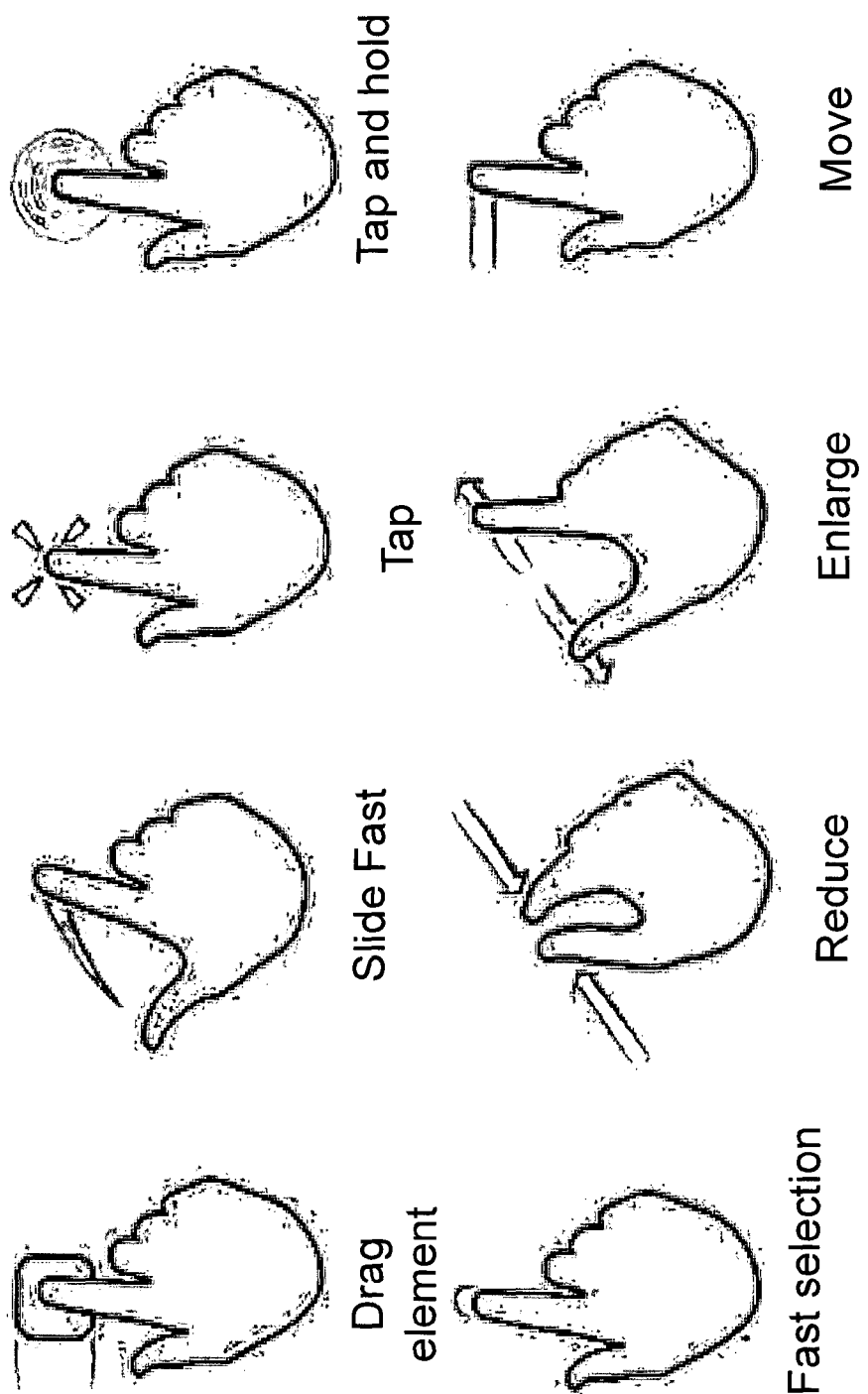
FIG. 4 shows several gestures known in the state of the art.
Figure 5:
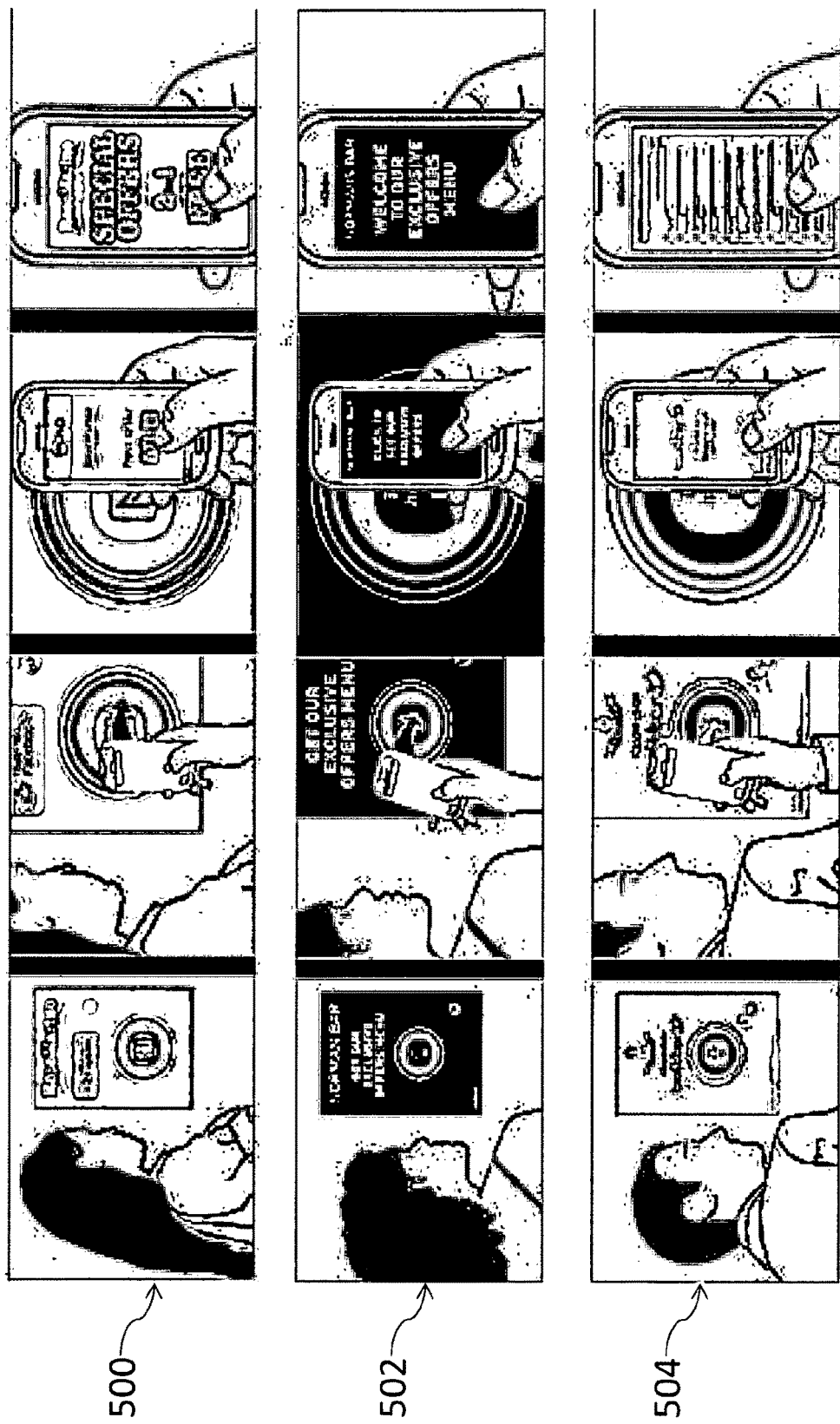
FIG. 5 depicts several use case, known in the state of the art, referred to NFC communication.
Figure 6:
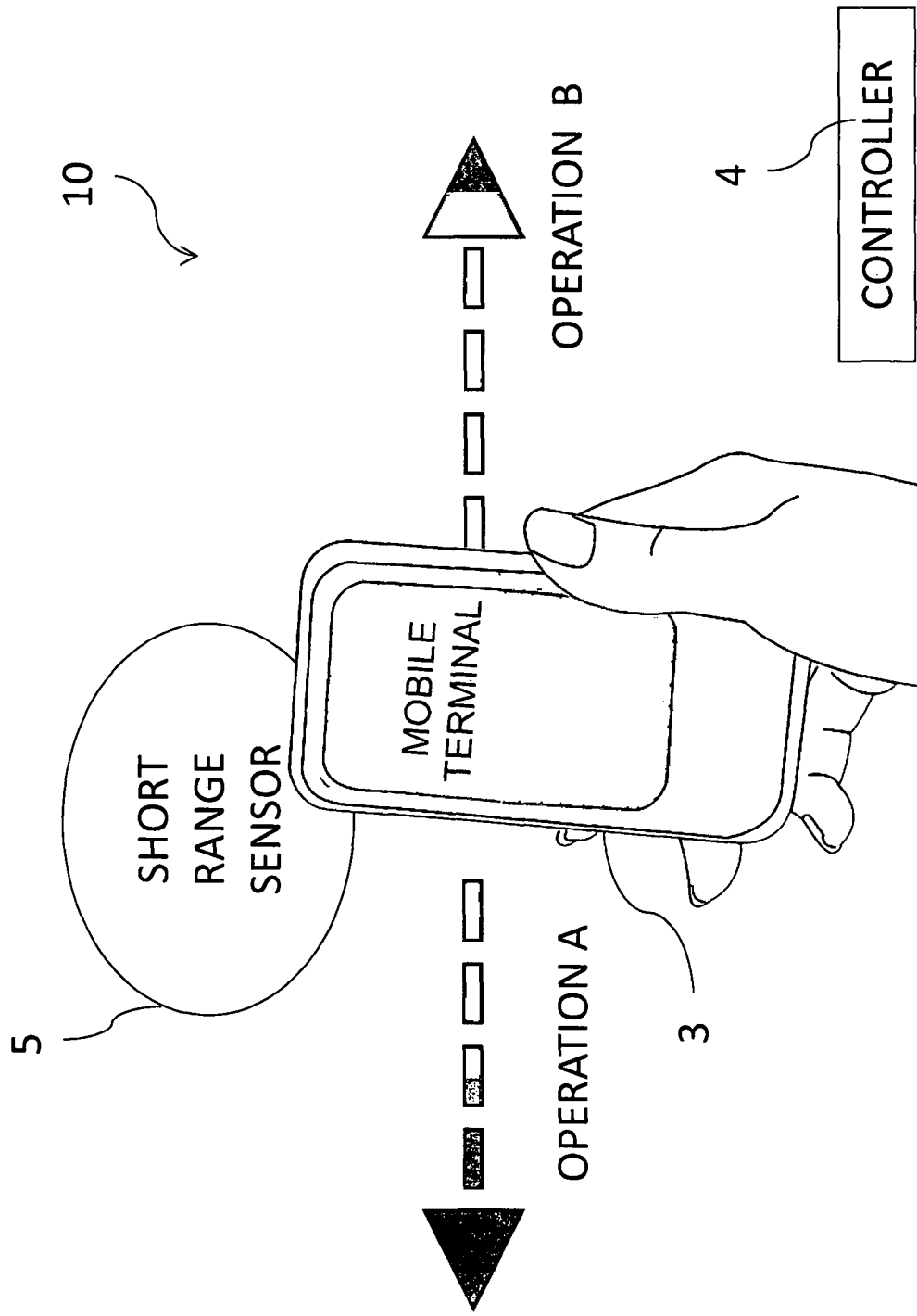
FIG. 6 shows an example of interaction between a mobile terminal and a short range wireless communication sensor according to the present invention.

With reference to FIG. 6, for example, a system 10 comprises a mobile terminal 3 which a user approaches to a short range sensor 5, which may consist, for example, in an NFC tag 1, equipped with a wireless readable memory containing an identification code and other programmable information; when mobile terminal 3 is in proximity of the communication range of short range sensor 5 a communication between them is established, particularly, a radio communication that involves the use of NFC protocol. Subsequently, according to the mobile terminal 3 movement and the information exchanged during the interaction, a controller 4 performs an operation, rather than another.

The term mobile terminal 3 refers to a mobile electronic device, in particular a cell phone, a smartphone, a badge or a credit card with at least one short range radio communication circuit and means for detecting the movement undergone by the device. For example, if the user moves the mobile terminal 3 leftwards, the controller 4 performs an operation A, if the user moves mobile terminal 3 rightwards, the controller 4 performs an operation B, which may be different from operation A.

Therefore, a user will be able to control the execution of both operations A and B through simple gestures and with a more natural and close to the everyday life approach, but above all by using only a short range sensor 5.

Short range sensors 5 may be NFC sensors (also called NFC labels or "tags") in which there is an memory area which is often used to hold information of textual type, for example, a link to a web page or at most a possible operation which can be performed as a result of reading such as, for example, sending an SMS ("Short Message Service") to a certain telephone number or an e-mail to a specified address and, recently, even changing some of the settings of a smartphone which has read the label (for example, enabling vibration, lowering ringer volume, activating a radio frequency communication, and so on).

Figure 7:
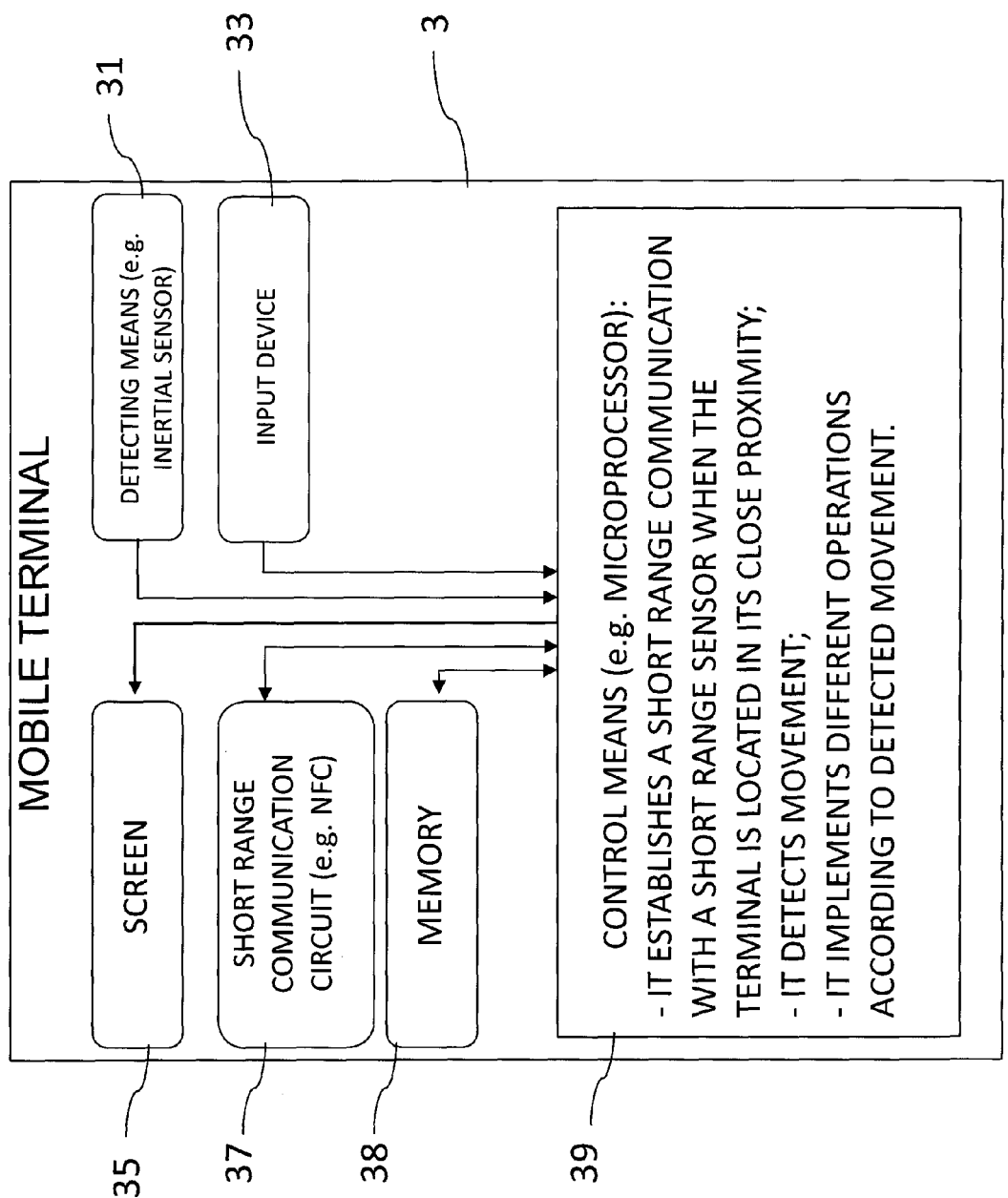
FIG. 7 depicts an example of a block diagram relating to a mobile terminal according to the present invention.

With reference to FIG. 7, in a preferred embodiment of the invention, the mobile terminal 3 includes, for example, detection means 31, in particular at least an inertial sensor such as an accelerometer and/or a gyroscope, at least an input device 33, such as a keyboard, at least a screen 35, at least a short range communication circuit 37, for example, an NFC circuit, at least a memory 38 and control means 39, in particular a microprocessor, able to establish a short range communication with the short range sensor 5 when the mobile terminal 3 is located in the proximity of the communication range of short range sensor 5.

This embodiment provides the advantage of using detecting means 31 supplied with the mobile terminal 3 adapted to detect at least a movement of the same mobile terminal 3 and, more generally, movements or gestures made by a user in the proximity of a short range sensor 5, in order to assign different operations which are associated to the performed and detected movement. Therefore, control means 39 are able to detect a mobile terminal 3 movement by means of data, provided from detecting means 31 and to control an operation based on the detected movement.

More particularly, the detection means 31 supplied with a mobile terminal 3 comprise inertial sensors. With the term inertial sensors we refer to that type of sensors which conceptually exploit the inertia of a contained inside them mass to measure linear accelerations (e.g., an accelerometer) or angular velocity (for example, a gyroscope).

Figure 8:
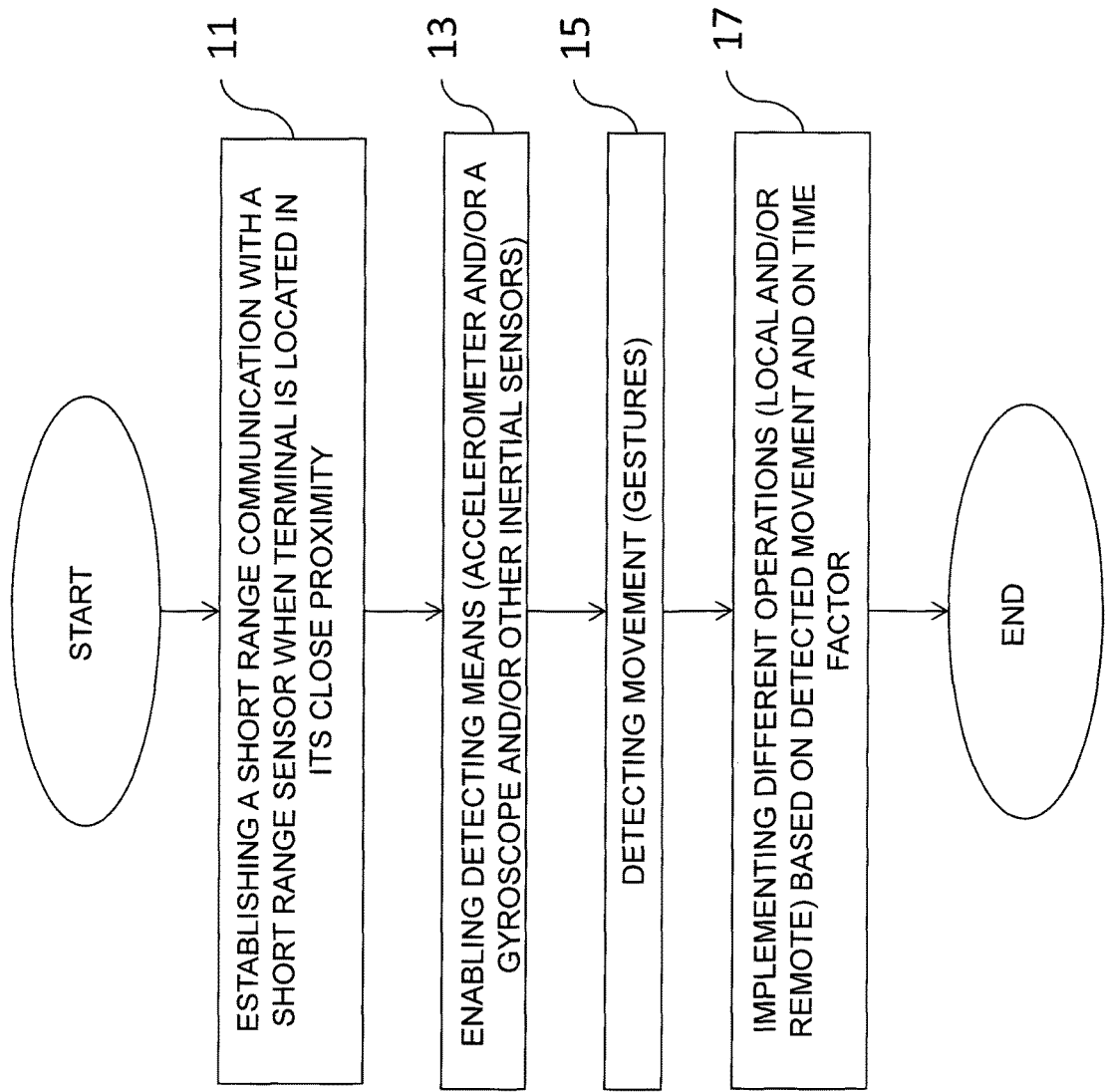
FIG. 8 depicts a flow diagram of the system operating logic according to the present invention.

Generally, with reference to FIG. 8, according to the present invention, system 10 operating logic provides to establish a short range communication connection with a short range sensor 5 at step 11, particularly an NFC sensor, when a mobile terminal 3 is located in proximity to communication range of short range sensor 5; at step 13 to enable one or more detection means 31 located on mobile terminal 3, at step 15 to detect one or more movements executed by a user on mobile terminal 3 and, at step 17, to perform an operation (local or remote) in correspondence of a specific movement or of a specific movement in a certain time period, for example, an rightward movement accomplished within five seconds.

In a further embodiment of the invention, a short range sensor 5 can contain, or store, association information between an operation and a mobile terminal 3 movement, and not only a single information relating to a single operation, which a user can perform in the proximity of short range sensor 5 itself.

Figure 9:
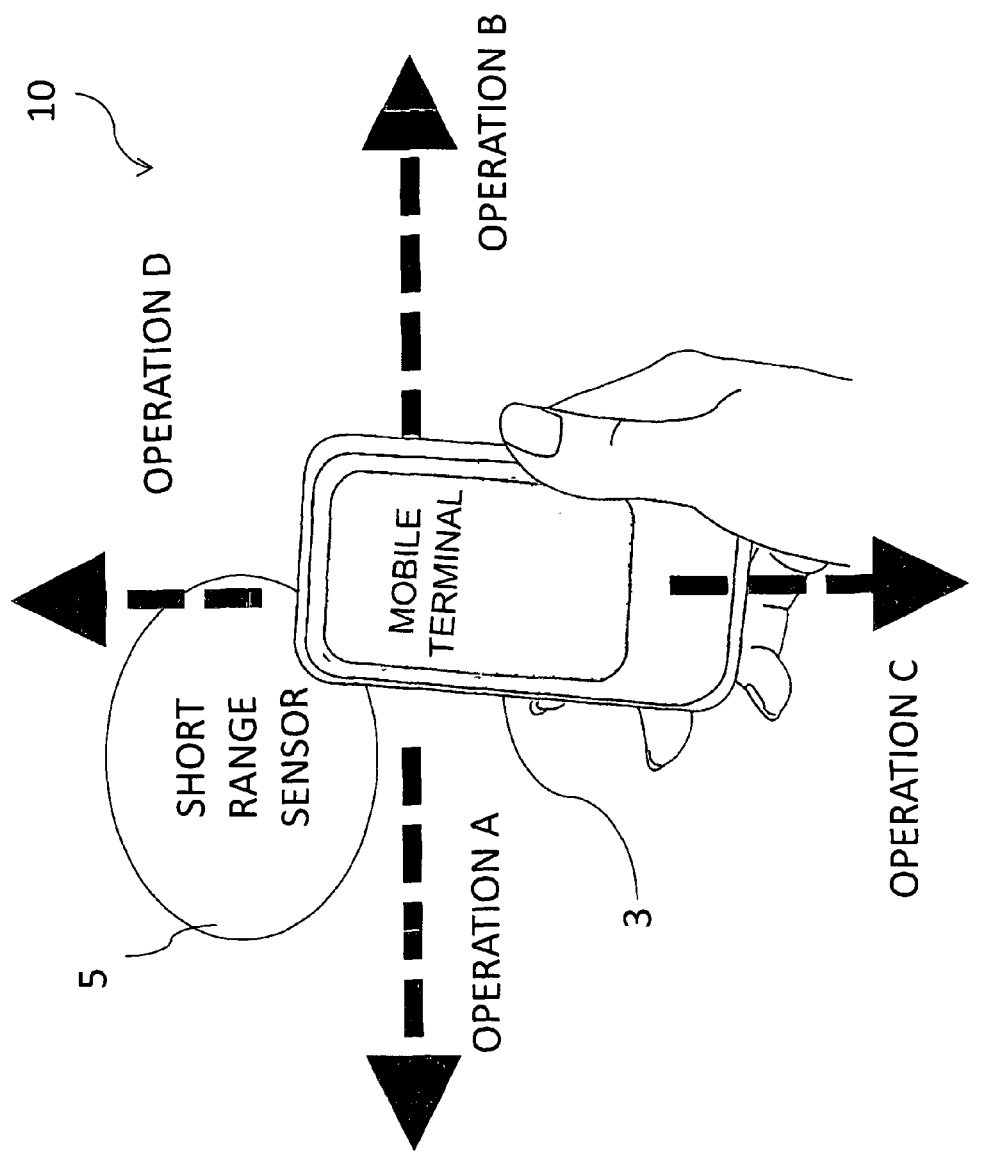
FIGS. 9 and 10 show two further examples of interaction between a mobile terminal and short range wireless communication sensor according to the present invention.

For example, with reference to FIG. 9, considering only horizontal and vertical movements, a single short range sensor 5 can handle at least four different operations:

Operation A: leftward movement of mobile terminal 3;
Operation B: rightward movement of mobile terminal 3;
Operation C: downward movement of mobile terminal 3;
Operation D: upward movement of mobile terminal 3.

The four above mentioned actions can be performed directly from mobile terminal 3 and, for example, they are used to adjust settings of the same mobile terminal 3 (e.g., enabling or disabling of a smartphone alarm or vibration), or to give commands while functioning as a media player.

Short range sensor 5 contains association information relating to four possible operations such as:

Operation A–Silent Mode=ON (silent=on);
Operation B–Silent Mode=OFF (silent=off);
Operation C–Vibration=ON (viber=on);
Operation D–Vibration=OFF (viber=off).

Association information of the transactions relating to various movements (gestures) can have, for example, a norm such as:

"1#" to show rightward movement;
"2#" to show downward movement;
"3#" to show leftward movement;
"4#" to show upward movement.

Taking advantage of this norm, association information contained in short range sensor 5 memory is, for example, an NDEF message ("NFC Data Exchange Format") containing the following text strings (possibly split into several records):

"1#http://130.192.85.18/apply?action=viber=on2#http://130.192.85.18/apply?action=silent=off3#http://130.192.85.18/apply?action=viber=off4#http://130.192.85.18/apply?action=silent=on".

Generally, in this representation one URL ("Uniform Resource Locator") is associated to each one of the four operations.

In another embodiment, it is possible to further differentiate movements, and therefore operations, according to the time taken to perform the movement itself by means of the mobile terminal. This embodiment leads to a doubling of possible operations, for example, you may get the following operations and respective movements:

Operation A: slow movement leftwards of mobile terminal 3;
Operation B: slow movement rightwards of mobile terminal 3;
Operation C: slow movement downwards of mobile terminal 3;
Operation D: slow movement upwards of mobile terminal 3;
Operation E: quick movement leftwards of mobile terminal 3;
Operation F: quick movement rightwards of mobile terminal 3;
Operation G: quick movement downwards of mobile terminal 3;
Operation H: quick movement upwards of mobile terminal 3.

In addition to these simple linear movements, it is possible to provide more complex movements and gestures such as, for example, shaking of mobile terminal 3, or prolonged "tapping" on short range sensor 5, or even intermittent movements of mobile terminal 3 with several consecutive readings of said short range sensor 5, or mobile terminal clockwise or counter clockwise rotation of a certain amount of degrees (for example, 90°, 180°) or, generally, any movement and/or gesture detected by detecting means 31 located on a mobile terminal 3.

In another embodiment, association information about operations to be performed is not stored directly into short range sensor 5, but it is stored and contained in an external remote device, such as a remote server. In this case, short range sensor 5 content could be, for example, simply a URL string such as "http://130.192.85.18/other_apply?gesture=". In this example, a software application on mobile terminal 3 completes the URL by adding a code for the performed gestures. By means of this mode you can easily add new gestures, since it is not necessary to rewrite association information on short range sensor 5 every time.

Another embodiment completely prevents mobile terminal 3 from switching from a remote server to perform the operation and, in this case, short range sensor 5 content could be, for example, the following string:

"1#viber=on2#silent=off3#viber=off4#silent=on".

In the latter approach, a software application, implemented through control means 39 on the mobile terminal 3, recognizes gesture and, taking advantage of the above said norm, performs the corresponding operation. In fact, mobile terminal 3 comprises control means 39 adapted to control and implement at least one mobile terminal 3 movement-based operation. The software application itself acknowledges the algorithm to use to implement the operation and thus, for example, the operating system API ("Application Programming Interface") of mobile terminal 3 to recall, in order to enable or disable mobile terminal 3 ringtone or vibration.

Obviously, the above mentioned embodiments represent only three possible storage modes of short range sensor 5, but, independently from the adopted mode, short range sensor 5 writing operation may be carried out both directly by the end user (using rewritable memory short range sensors 5), and by the service provider or by short range sensors 5 themselves (using rewritable memory or read-only short range sensors 5).

Figure 10:
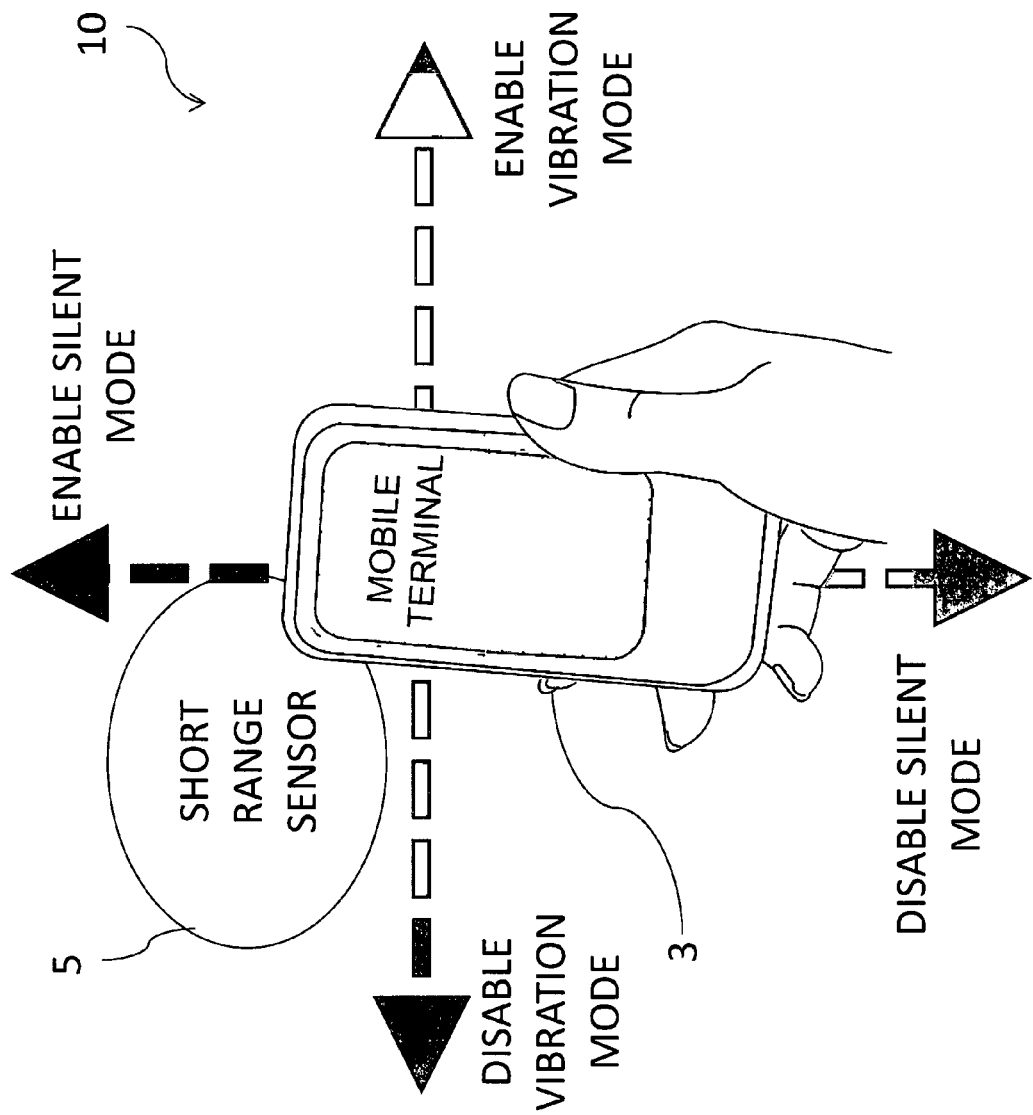

With reference to FIG. 10, it is supposed that on mobile terminal 3 there is a software application, implemented through control means 39, able to carry out the possible operations A, B, C and D according to the detected movement. Therefore, this software application will be able to use the operating system API in order to enable and disable mobile terminal 3 ringtone or vibration, in particular case a smartphone.

From a practical point of view, at first the software application, then control means 39, will be waiting to detect short range sensor 5 presence and, as soon as this happens, it will read its content. The application knows the norm through which short range sensor 5 has been stored and it is, therefore, able to identify it as a special sensor in which several operations are stored then associated.

More in detail, the application, then control means 39, will have to enable vibration as a result of a rightward movement of mobile terminal 3, will have to disable silent mode as a result of a downward movement, will have to disable vibration as a result of a leftward movement and, finally, will have to enable silent mode as a result of an upward movement.

As soon as the association information stored in said short range sensor 5 will be read by mobile terminal 3, the application will enable mobile terminal 3 detection means 31, for example an accelerometer, to detect any mobile terminal 3 movement, independently from its orientation.

Figure 11:
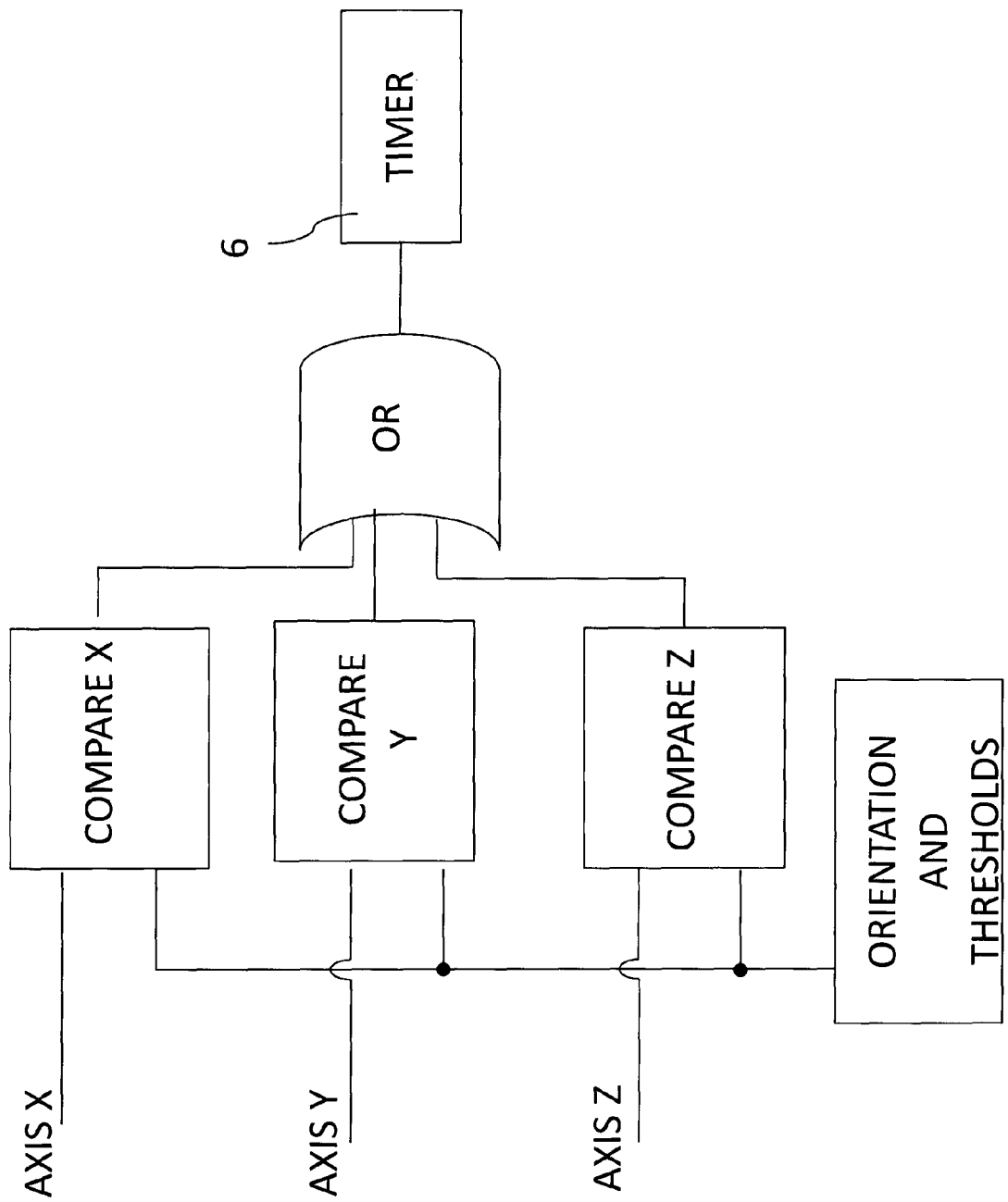
FIG. 11 depicts a block diagram for the detection of the mobile terminal movement according to the present invention.

One embodiment for mobile terminal 3 movement detection may be the one represented in FIG. 11. In this embodiment, values from a mobile terminal 3 three-axis accelerometer are first of all reset ("reset" values), to take into consideration mobile terminal 3 orientation and they are later compared to a value threshold to detect any movements on each of the three axis.

Additionally, a timer 6, for example, implemented on mobile terminal 3 by means of a software function, can be used as a countdown timer (function "count-down"), which sets the amount of available time to complete user's interaction between the mobile terminal 3 and the short range sensor 5, measuring the elapsed time from short range communications sensor 5 presence detection or from information receipt by mobile terminal 3, that is the elapsed time from interaction with said sensor. If before the end of the countdown carried out by timer 6 the threshold of one of the three axes is exceeded, namely a mobile terminal 3 movement is detected, the software application performs the operation corresponding to the movement by recalling, for example, the corresponding API.

In the event that, finally, any threshold is not exceeded, data reading by means of detecting means 31 is disabled and the mobile terminal 3 starts again waiting to detect short range sensor 5 presence.

Figure 12:
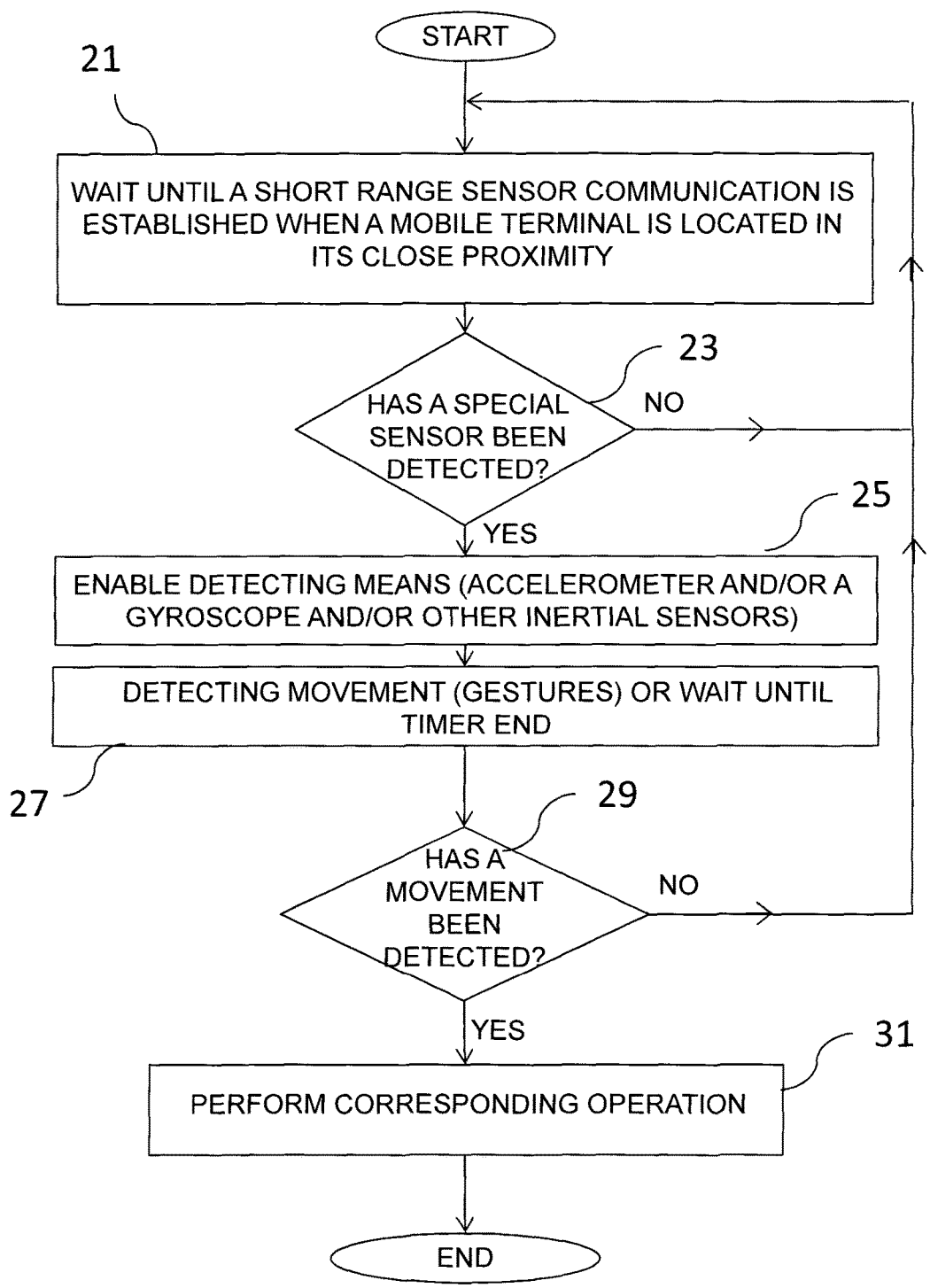
FIG. 12 depicts an example of flow diagram of the system operating logic according to the present invention.

The overall operation logic related to the above mentioned embodiment is depicted in FIG. 12. At step 21, mobile terminal 3 is waiting to establish a connection with short range sensor 5, the connection that occurs when mobile terminal 3 is located in the proximity of the communication range of short range sensor 5; at step 23, mobile terminal 3 wonders whether short range sensor 5 is a special sensor that stores association information relating to several operations that will be transferred to mobile terminal 3; if not, it returns to step 21, otherwise, at step 25, the mobile terminal 3 enables movement detection means 31, particularly at least one inertial sensor, and at step 27, such detecting means 31 detect possible movement of the mobile terminal 3 or they wait for the end of countdown timer 6; at step 29, if no movement is detected it returns to step 21, otherwise, at step 31, mobile terminal 3, and particularly control means 39 implement the operation corresponding to the performed movement on the basis of association information obtained by the short range sensor 5.

Figure 13:
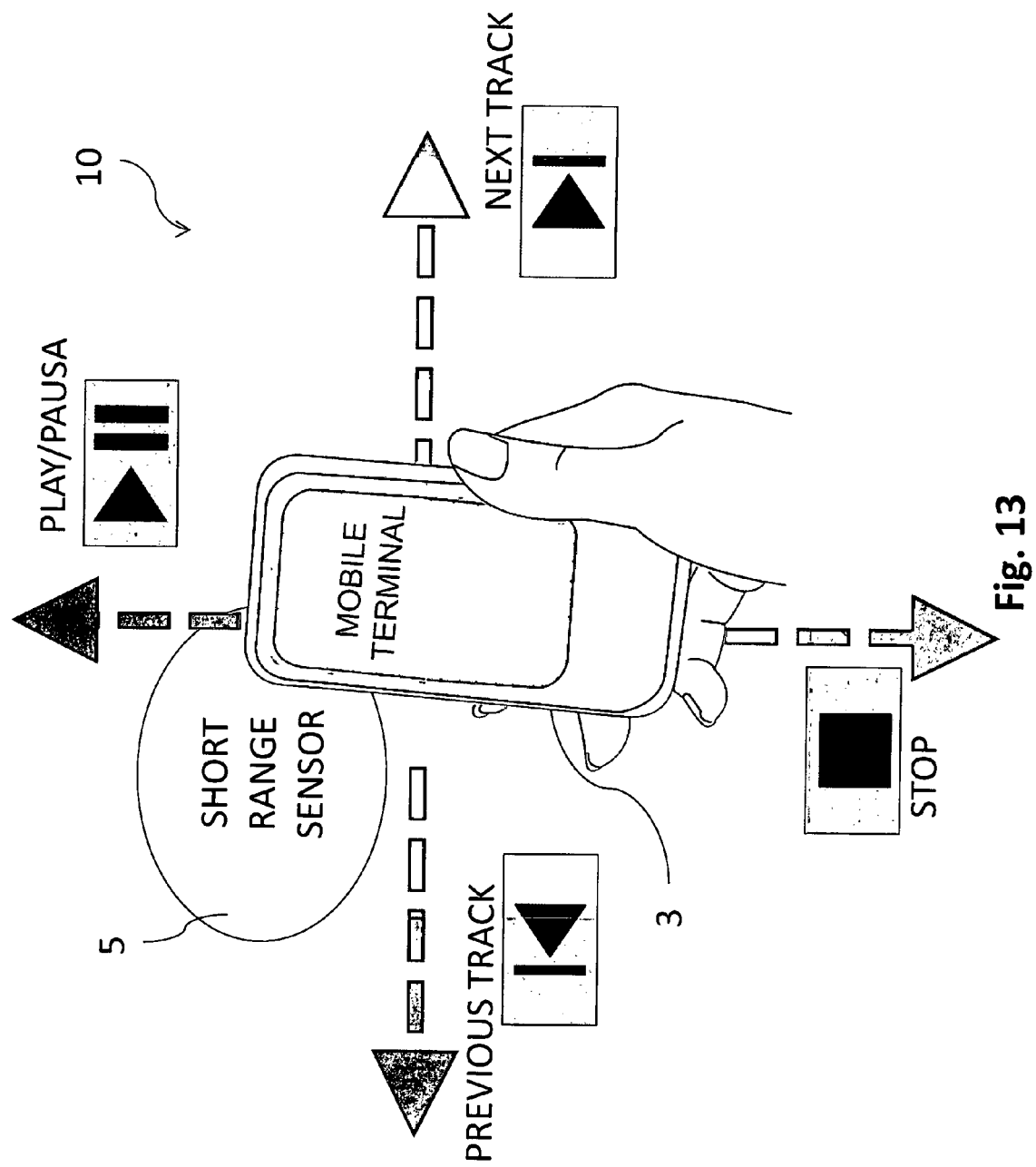
FIGS. 13 and 14 show two further examples of interaction between a mobile terminal and short range communication sensor according to the present invention.

Similarly to the embodiment with reference to FIG. 10, it is further possible to realize a simple media player (also commonly said reader or "player") using a single short range sensor 5. For this purpose, with reference to FIG. 13, the operation "go to next track" could be associated, for example, to rightward movement, the operation "go to previous track" to leftward movement, the operation "play" or "pause" to upward movement (the operation "play" can be performed if the player is stopped or paused, the operation "pause" can be performed if the player is playing the current track), and the operation "stop" to interrupt playback to downward movement. Even in this case, the working logic is the same as the one depicted in FIG. 12; the embodiment of FIG. 13 differs from the one in FIG. 10 only for the operations that are carried out by mobile terminal 3 in correspondence to different movements.

The two above mentioned examples represent only a very small subset of possible embodiments according to the present invention. It is possible to associate operations related to mobile terminal most varied settings changes ("Phone Settings"), launching software applications rather than uninstalling or installing them, connecting a Wi-Fi network ("Wireless Fidelity") rather than a Bluetooth device or even sending a SMS message to a particular phone number, sending a chat message to a specific contact, starting or ending a phone call, accessing a certain social network (commonly said "social network"), sharing information with a contact, opening a certain web page, and so on.

All the above said operations can be assigned by the present invention mechanism on the basis of the mobile terminal working state: this state can advantageously be changed by the detection of NFC tag proximity. In the event for example of the four movements control system in FIG. 10, when mobile terminal 3 detects short range sensor 5 presence, it can optionally give feedback about sensor 5 being read by means of any type of sound or mechanical (vibration) indication through appropriate signalling means, not shown in FIG. 16 and/or visual indication by means of a warning on screen 35 of mobile terminal 3. In addition, it is expected that it will automatically display on its screen 35 information relating to movements and associated commands enabled on that sensor. In fact, the mobile terminal 3 can store such movements and their associated commands in an internal memory 38 (media playback starting, door opening, etc.) in association with the unique identifier which identifies the short range sensor 5 (for example, an NFC tag) in a univocal way. In this way, the user is helped to remember what commands and movements can be assigned once mobile terminal 3 has come in radio contact with a specific short range sensor 5. Automatic visualization can preferably be enabled or disabled by the user in mobile terminal 3 settings menu, if helping data are deemed to be unnecessary to remind the user which operations are available for that short range sensor 5 and which movements are to perform in order to obtain the execution. This visualization is especially useful when certain operations are permitted in all mobile terminals 3 (for example, bell ringing), and the user does not know which operations an unknown to him short range sensor 5 is not able to perform and with which movements.

Figure 14:
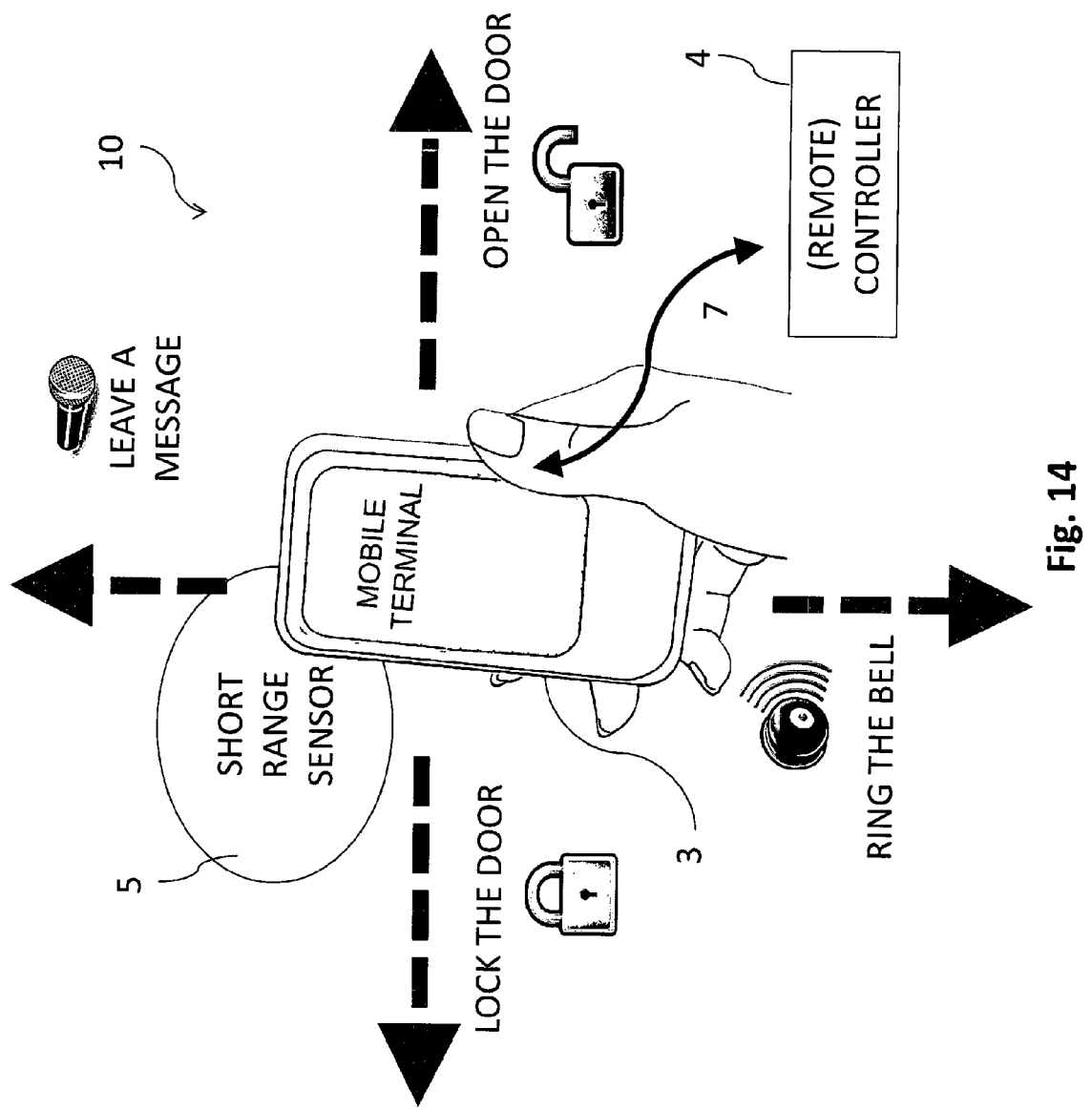

With reference to FIG. 14, a further embodiment, according to the present invention, provides, for example, that system 10 includes a short range sensor 5 to control the opening and closing of a door lock according to the user's gestures.

This example is more complex than previous embodiments, since the operation execution does not end directly on mobile terminal 3, but on a possibly remote controller 4 located in the system 10. In this embodiment, it is assumed that within short range sensor 5 association information between mobile terminal 3 operations and movements that the user can perform are already present and encoded (for example, already stored by the manufacturer during short range sensor 5 manufacture).

Besides, it is assumed to use, for the association of operations with different movements, a norm of the type:
"1#" to show rightward movement;
"2#" to show downward movement;
"3#" to show leftward movement;
"4#" to show upward movement.

Taking advantage of this norm, the memory area content of short range sensor 5 is, for example, a NDEF message containing the following association information (possibly split into several records):
"1#http://130.192.85.18/apply?action=open_door2#http://130.192.85.18/apply?action=ring_bell3#http://130.192.85.18/apply?action=lock_door4#http://130.192.85.18/apply?action=leave_message".

In this case, a software application implemented by means of control means 39, located on mobile terminal 3, recognizes gestures by means of data supplied from detecting means 31 located on the same mobile terminal 3 and, taking advantage of the above mentioned norm, it controls the operation corresponding to the movement, by recalling, for example, a web service on the controller 4. More in detail, the mobile terminal 3 and the controller 4 communicate through a (wireless or cable) communication channel 7, i.e., mobile terminal 3 transmits the above mentioned NDEF message content and the norm code corresponding to the performed movement (for example, #1 or #2 or #3 or #4) to the controller 4. The controller 4 receives this information and implements the operation corresponding to the movement. In particular, communication channel 7 can be a Bluetooth channel type or Wi-Fi or Wi-Fi Direct, or Ethernet, and so on.

Figure 15:
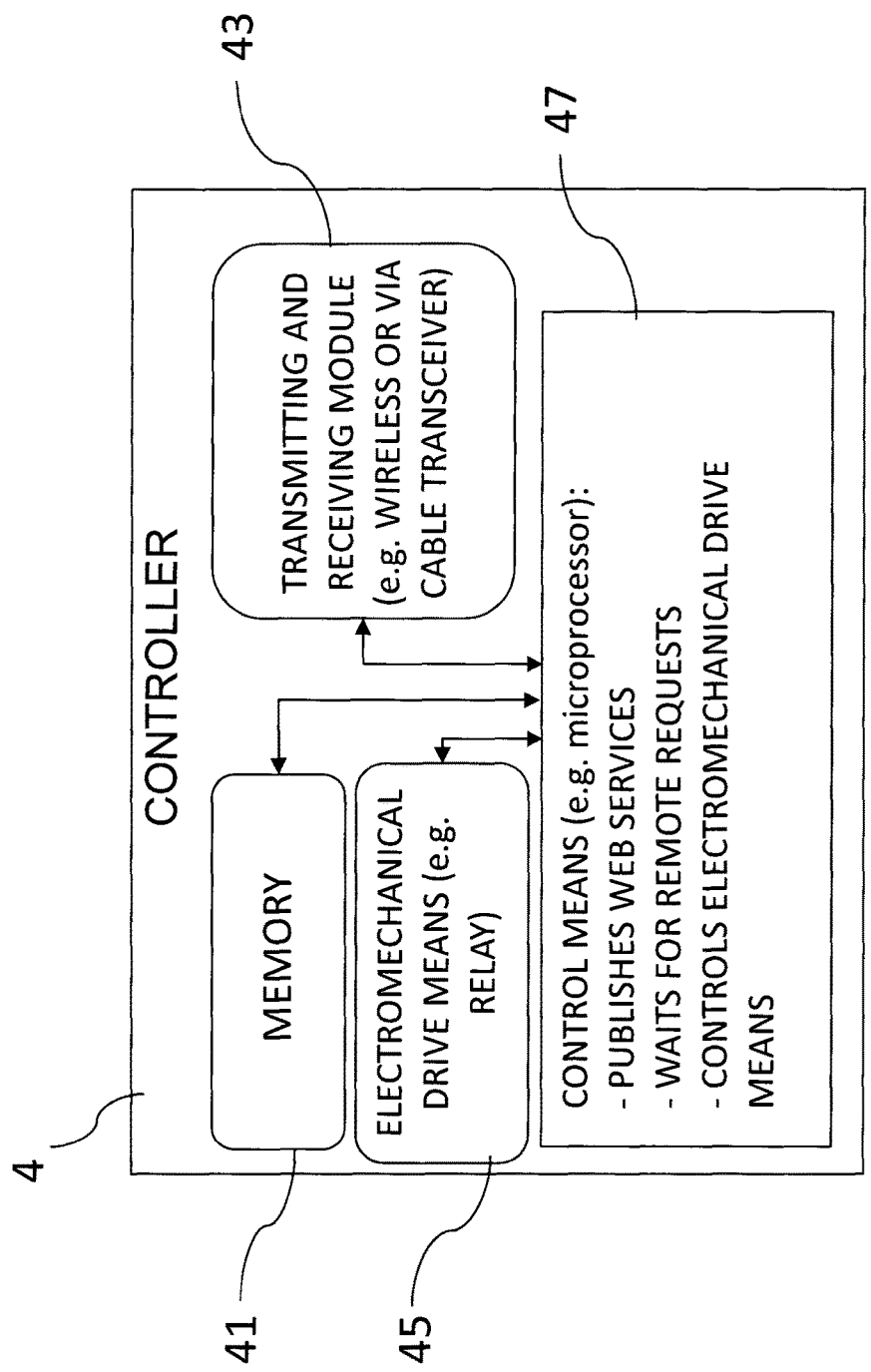
FIG. 15 depicts a controller block diagram.

With reference to FIG. 15, the controller 4 may be an "embedded" system with computational capability and comprising at least a memory 41, at least one transmission and reception module ("transceiver") 43, particularly a wireless or via cable transceiver, to exchange data with mobile terminal 3, electromechanical drive means 45, particularly a relay, through which the controller 4 is capable of driving special actuators which, in the example of FIG. 14, correspond to an electric door lock, a bell (or buzzer) and a voice recorder. Furthermore, the controller 4 comprises second control means 47, particularly a microprocessor, which publishes web services, handles remote requests from mobile terminal 3, particularly directed to a certain address (in the example, http://130.192.85.18) and controls the electromechanical driving means 45. Basically, the controller 4 can perform remote web server functionality and, by means of the second control means 47, it implements the operation.

Figure 16:
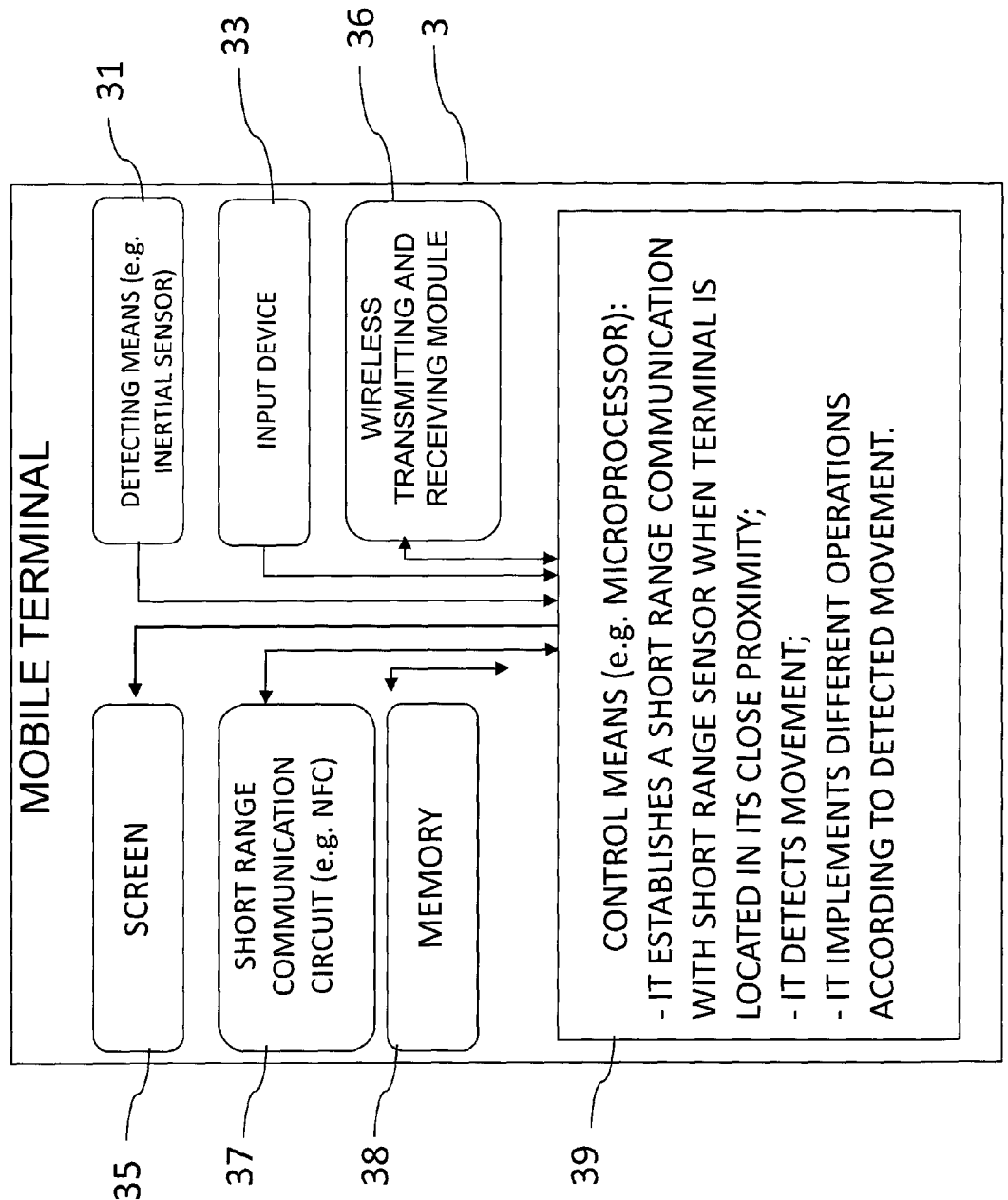
FIG. 16 depicts a further example of a block diagram relating to a mobile terminal according to the present invention.
Figure 17A:
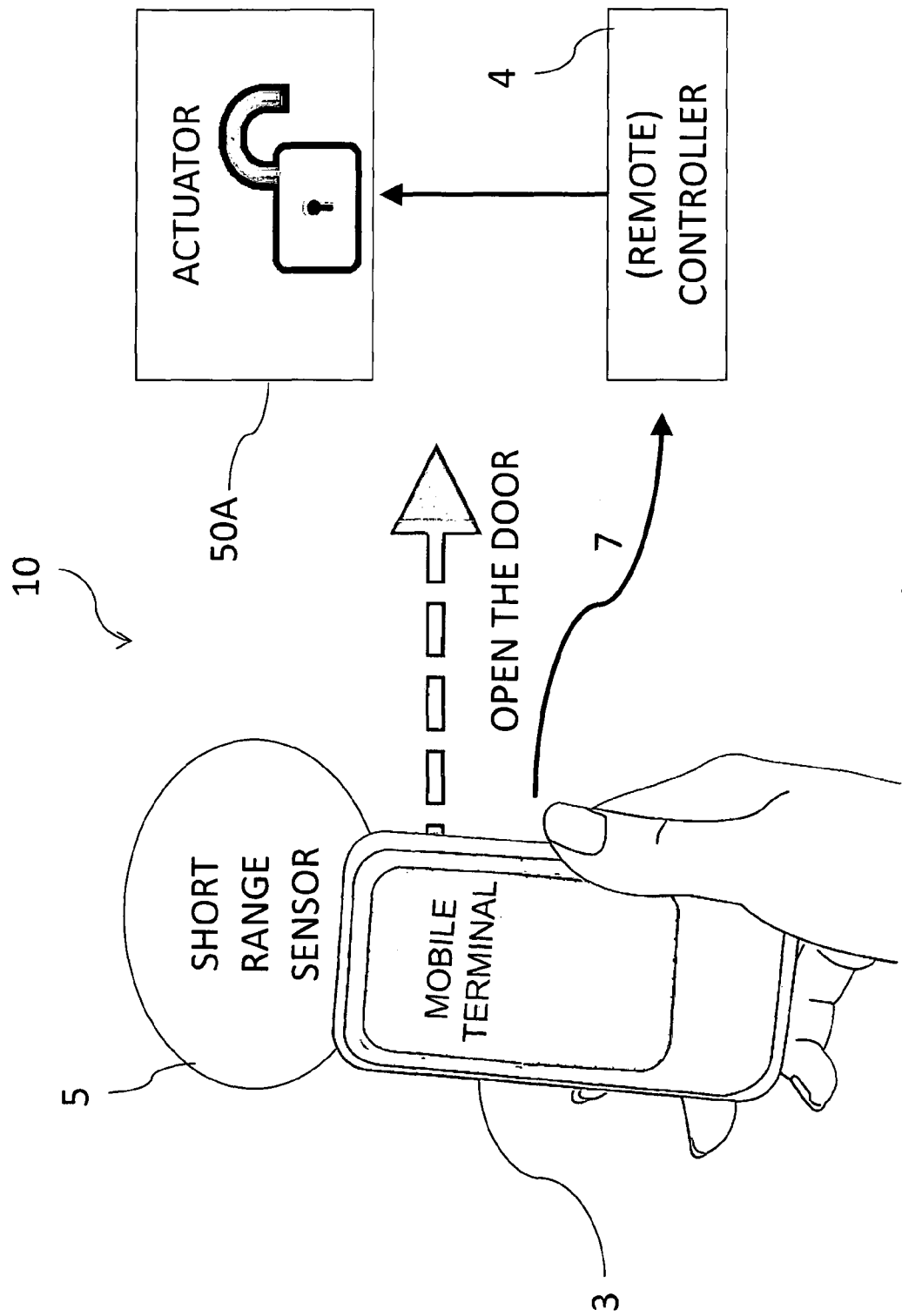
Figure 17C:
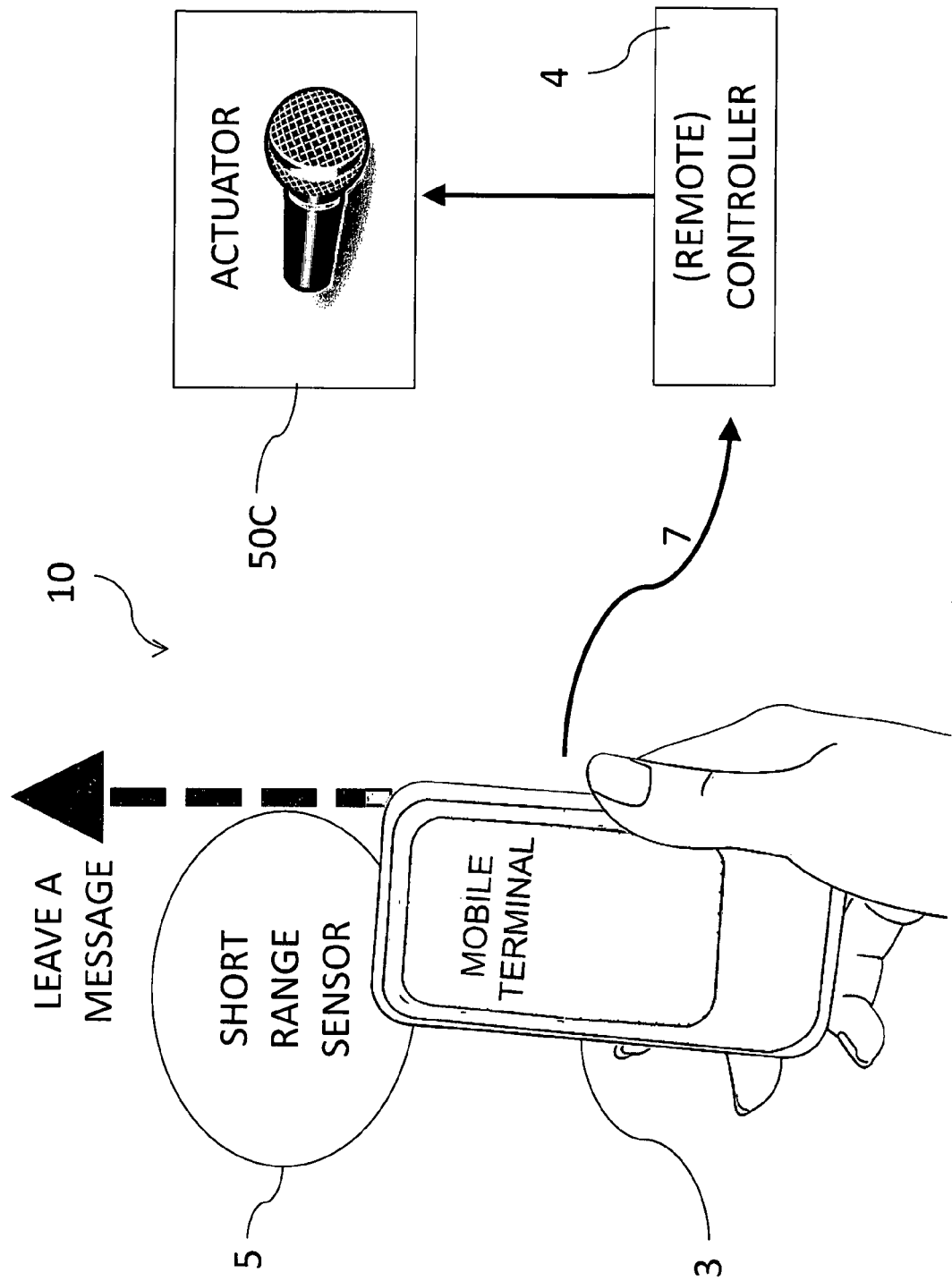
Figure 17D:
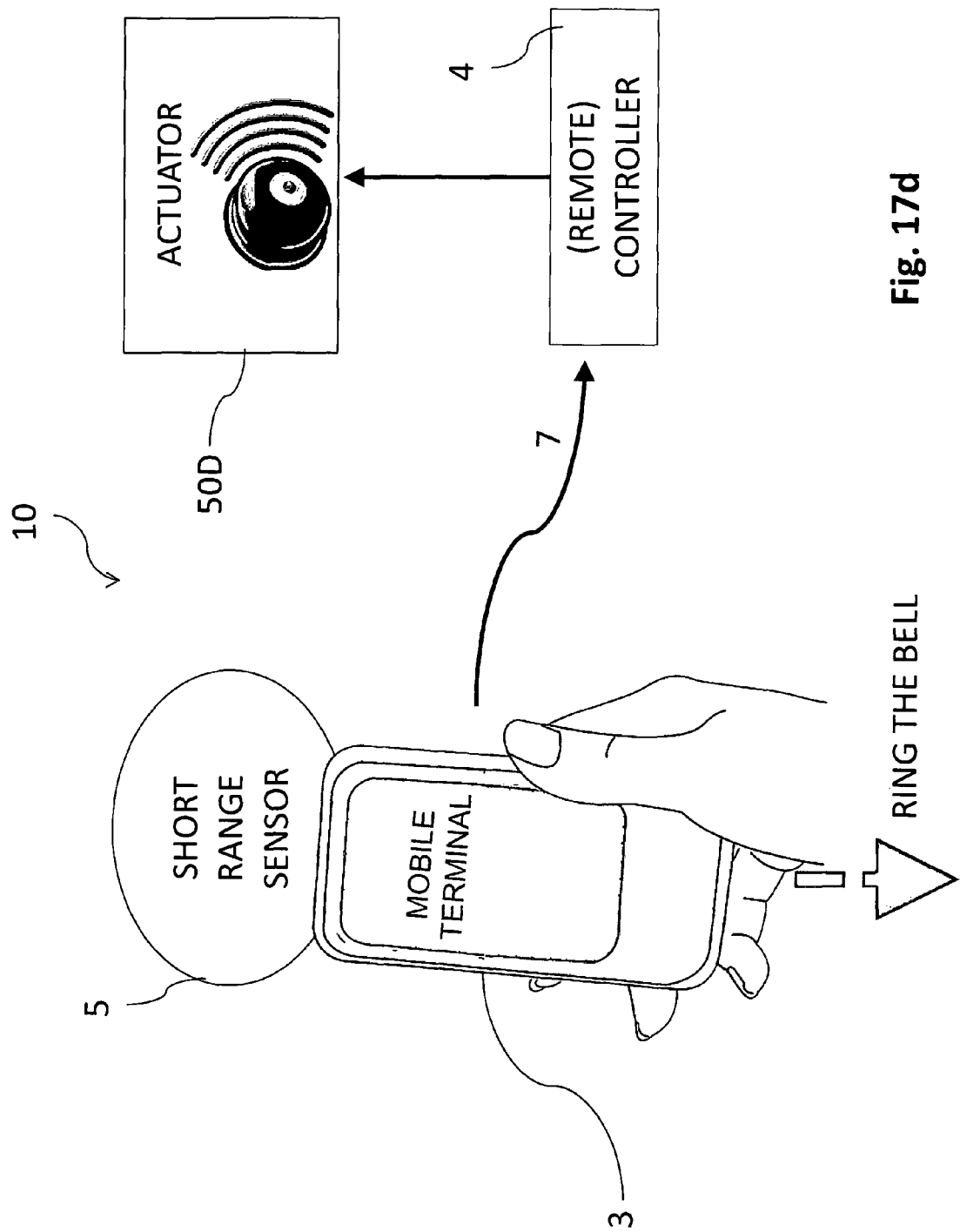

With reference to FIG. 16, another embodiment of the invention provides that mobile terminal 3 also includes a second transmitting and receiving module (transceiving or "transceiver") 36 to communicate with the controller 4 wirelessly, and moreover, the control means 39 control remotely the controller 4, which implements a based on detected movement operation.

With reference to FIGS. 17a, 17b, 17c and 17d, the four possible actions related to the example of FIG. 14 are illustrated, respectively, door opening as a result of a mobile terminal 3 rightward movement, implemented as last resort by an actuator 50A, door closing as a result of a mobile terminal 3 leftward movement, implemented as last resort by an actuator 50B, voice message recording as a result of a mobile terminal 3 upward movement, implemented as last resort by an actuator 50C, bell ringing playing as a result of a mobile terminal 3 downward movement, which has been implemented as last resort by an actuator 50D.

From a functional point of view, at first a mobile terminal 3 software application, then control means 39, will be waiting to detect short range sensor 5 presence and, as soon as this happens, they will read its contents. The software application knows the norm through which short range sensor 5 has been stored and, therefore, it is able to identify it as a special sensor which several operations are associated to.

More in detail, the software application will know that, as a result of a rightward movement, will have to recall web service on the controller 4, available, for example, on the URL http://130.192.85.18/apply?action=open_door; following a downward movement, it will have to recall web service on the controller 4, available, for example, on the URL http://130.192.85.18/apply?action=ring_bell; following a leftward movement, it will have to recall web service on controller 4, available, for example, on the URL http://130.192.85.18/apply?action=lock_door; and finally, after an upward movement, it will have to recall web service on controller 4 available, for example, on URL "http://130.192.85.18/apply?action=leave_message."

Therefore, as soon as the mobile terminal 3 has finished reading short range sensor 5 memory contents, the software application, or control means 39, enable detection means 31 located on mobile terminal 3 to detect a possible own movement (independently from the orientation of the same).

Figure 18:
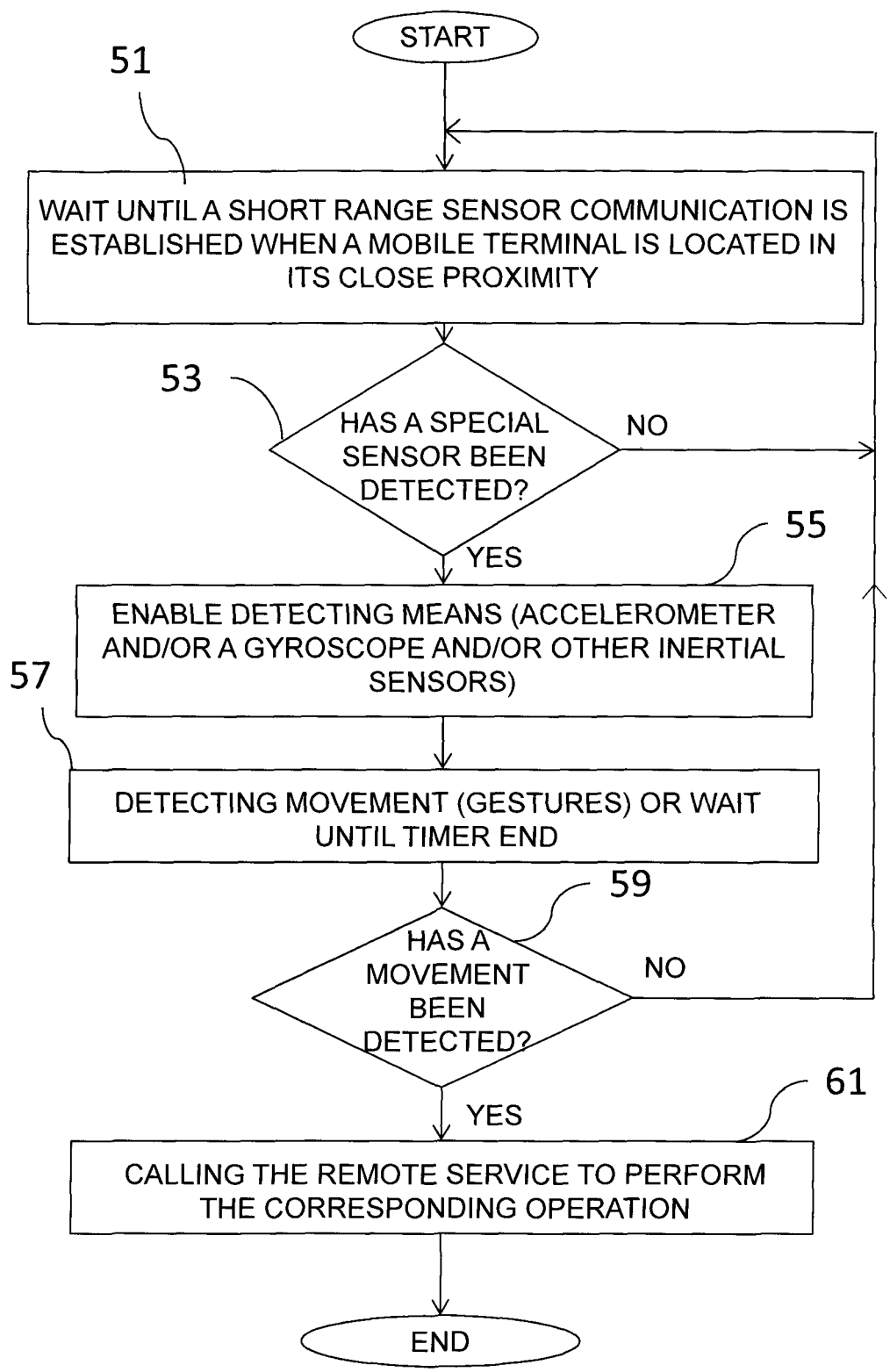
FIG. 18 depicts an example of flow diagram of the system operating logic according to the present invention.

A flow diagram of this embodiment operating logic, according to the present invention, is shown in FIG. 18. At step 51 mobile terminal 3 is waiting to establish a short range connection with short range sensor 5, connection that occurs when mobile terminal 3 is located in proximity to communication range of short range sensor 5; at step 53 mobile terminal 3 wonders whether short range sensor 5 is a special sensor that stores association information relating to several operations that will be transferred to mobile terminal 3; if not, it returns to step 51, otherwise, at step 55, mobile terminal 3 enables movement detection means 31, and at step 57, the latter detect possible movement of mobile terminal 3 or they wait for the end of timer 6; at step 59, if no movement is detected it returns to step 21, otherwise, at step 61, mobile terminal 3 recalls a remote web service to implement the operation to the controller 4, which, as a consequence, will drive the actuator 50 according to association information found by the short range sensor 5.

The controller 4 may optionally store in its memory 41 a table which maps mobile terminals 3 identifiers to operations they are allowed to carry out, for example door or private property gate opening or closing. A specific command is sent from a mobile terminal 3 to the controller 4 together with said identifier, for example, the IMEI code ("International Mobile Equipment Identity") or a password, using the two-way range communication channel 7, shown in FIG. 17 as a one-way channel only because it refers therein to the command direction; the controller 4 checks to see whether it is present in the table and whether it is authorized to perform the requested operation, and, if so, it makes the appropriate actuator (for example 50A and 50B) perform the desired command. If not, the controller 4 does not implement the command and it may preferably send a negative feedback in clear text (i.e., not encrypted) to mobile terminal 3 by means of the transmitting and receiving module 43. Mobile terminal 3 receives such feedback through its second transmitting and receiving module 36 and it indicates the command non-execution and/or the lack of an appropriate authorization to the user in any way, for example through a visual indication on screen 35. Obviously, feedback can be sent to mobile terminal 3 even in the event that the controller 4 has started the requested operation implementation.

Preferably, the command and the identifier are sent from mobile terminal 3 to the controller 4 in encrypted form to prevent unauthorized persons from intercepting and interpreting sensitive information contained in the communication. In order to enable a mobile terminal 3 to perform restricted operations an installation and activation stage of mobile terminal 3 can be foreseen near a controller 4, wherein a controller 4 acquires mobile terminal 3 identifying information adapted to identify it in a univocal way. During the enabling process of mobile terminal 3 it can be advantageously required to enter passwords or authorization codes known only by the controller 4 installer and by authorized users in order to prevent unauthorized enabling. This procedure can be preferably done in encrypted form and after entering the appropriate login credentials using a wireless communications protocol, protected and supported by both electronic devices 3 and 4.

The procedure to enable mobile terminal 3 at controller 4 is generally performed only once for each mobile terminal 3; during the same procedure it is possible to disable a mobile terminal 3 or add or remove individual operations that it is authorized to perform (for example open the door but not to close it). Obviously, it is possible that transactions, carried out by several actuators 50 controlled by the controller 4, do not require to be enabled, as they are not subject to any restriction of access: typical examples are the doorbell ringing (actuator 50D) or leaving a voice message over the intercom (actuator 50C), these latter operations should appropriately allowed to everyone.

The logic, able to recognize movements following short range sensor 5 reading, lies in a software application installed on mobile terminal 3, but this is only one of the possible variations. In fact, this logic may also reside in a remote electronic device, which mobile terminal 3 is able to access.

As it can be easily imagined, the disclosed embodiments can be made more complete and functional, combining a much higher number of transactions to the same short range sensor 5 and taking advantage of several factors to enable them. For example, it might be thought to differentiate operations depending on movement execution speed (slow and fast movements), introducing even the time factor among the parameters to be taken into account for the discrimination of performed movement.

It is important to note that with an approach of this kind it is possible for the end user to execute a big number of operations, potentially also complex, with absolute easiness and simplicity.

From the foregoing description, therefore, the characteristics of the present invention turn out to be clear, as well as its advantages.

A first advantage of short range wireless communication system and method according to the invention is to improve a user terminal usability, upon use of gestures and movements performed on a mobile terminal that the user is authorised to use in a plain and easy way, and to carry on any occasion.

A second advantage of short range wireless communication system and method according to the invention is to make operations control more natural for a user. These gestures can be selected so as to resemble those normally performed by the user in correspondence of a certain operation. Thus, for example, it can be selected a clockwise rotation, greater than or equal to 90°, of the mobile terminal around its longitudinal axis to control a door closing and a rotation in the opposite direction to open it, thus simulating the usually accomplished movement on a key, inserted into the lock to carry out, respectively, the closing and the opening.

A third advantage of short range wireless communication system and method according to the invention is to allow a user to implement such a short range wireless communication in a simple and low cost way.

A further advantage of short range wireless communication system and method according to the invention is to allow a mobile terminal to control a remote processor as a result of an interaction with only one short range communication sensor, particularly an NFC sensor.

A further advantage of short range wireless communication system and method according to the invention is to allow a user to expand the gestures range with his own mobile terminal so as to implement a plurality of operations on his own mobile terminal.

A further advantage of short range wireless communication system and method according to the invention is to allow a user to expand the gestures range with his own mobile terminal so as to implement a plurality of actions on a remote processor.

A further advantage of short range wireless communication system and method according to the invention is to allow a user to drive a plurality of electronic devices by using only a short range sensor and a mobile terminal.

For electronic device it is understood a mobile terminal 3, a controller 4, an actuator 50, a web server, and so on.

There are many possible variations to short range wireless communication system and method, particularly an NFC communication, comprising a short range sensor communication and a mobile terminal having improved features, without departing from the novelty principles incidental to the inventive idea, as well as it is clear that in its practical implementation forms of illustrated details can be different, and the same may be replaced with technically equivalent elements.

For example, a possible alternative would be not to store anything on the short range sensor 5, considering only the sensor identifier, and storing association information relating to the operations to be performed on a remote electronic device (eg, a web server), or even having them directly stored within mobile terminal 3 which carries out short range sensor 5 reading.

Therefore, it is easily understandable that the present invention is not limited to short range wireless communication system and method, in particularly an NFC communication, comprising a short range communication sensor and a mobile terminal having improved features, but it is liable to various modifications, improvements, parts and equivalent elements replacement without departing from the idea of the invention, as it is better specified in the following claims.

The invention claimed is:

1. A short range wireless communication system comprising:
   a short range wireless communication sensor, and
   a mobile terminal adapted to interact with said short range wireless communication sensor,
   wherein said mobile terminal comprises detecting means for detecting at least a movement of said mobile terminal following the interaction with said short range wireless communication sensor and wherein said mobile terminal comprises control means for controlling an operation based on said movement and said interaction with said short range wireless communication sensor, said short range wireless communication sensor storing association information between said operation and said movement of said mobile terminal;
   at least an actuator adapted to carry out said operation at a reception of a specific command and driven by a remote electronic device operatively coupled to said mobile terminal;
   wherein said mobile terminal receives from said short range wireless communication sensor said association information between said operation and said movement of said mobile terminal, adds a mobile terminal identifier as a unique identifier of itself and transmits said mobile terminal identifier to said remote electronic device together with said association information,
   wherein said remote electronic device stores a table which maps a mobile terminal identifier to operations the remote electronic device is allowed to carry out so that when the specific command is wirelessly sent from said mobile terminal to the remote electronic device together with said mobile terminal identifier, the remote electronic device checks whether the mobile terminal identifier is present in the table and whether the remote electronic device is authorized to perform said operation, and, in a positive case, said remote electronic device causes said at least an actuator to perform said operation.

2. The system according to claim 1, wherein said association information between said operation and said at least a movement of said mobile terminal comprises at least one Uniform Resource Locator (URL).

3. The system according to claim 1, wherein said system comprises said remote electronic device and second control means for further controlling said operation based on said movement of said mobile terminal.

4. The system according to claim 1, wherein said short range wireless communication sensor is a sensor of NFC or Near Field Communication type.

5. The system according to claim 1, wherein said detecting means comprises inertial sensors, in particular either at least an accelerometer or at least a gyroscope.

6. The system according to claim 1, wherein the implementation of said operation depends from the performance of said movement of said mobile terminal within a predetermined time gap starting from said interaction.

7. The system according to claim 1, wherein, in a negative case, the remote electronic device does not implement the specific command and sends a negative feedback in clear text to the mobile terminal.

8. The system according to claim 7, wherein the mobile terminal receives said negative feedback and indicates non-execution of the specific command and/or the lack of an appropriate authorization.

9. The system according to claim 1, wherein the specific command and the mobile terminal identifier are sent from said mobile terminal to the remote electronic device in encrypted form to prevent unauthorized interception and interpretation of sensitive information contained in the communication.

10. The system according to claim 1, wherein, in order to enable the mobile terminal to perform restricted operations, an installation and activation stage of said mobile terminal is performed, wherein the remote electronic device acquires mobile terminal identifying information adapted to identify it in a univocal way.

11. The system according to claim 1, wherein the mobile terminal is required, prior to interacting with said short range wireless communication sensor, to enter predetermined passwords or authorization codes in order to prevent unauthorized enabling.

12. The system according to claim 1, wherein said remote control device causes said at least an actuator to carry out said operation only after a user of said mobile terminal has entered predetermined login credentials and wherein said specific command is transmitted from said mobile terminal to said remote electronic device in encrypted form using a wireless communications protocol, protected and supported by both the mobile terminal and said at least an actuator.

13. A method to control an electronic device through a mobile terminal in a short range wireless communication, said method comprising the steps of:
   making a mobile terminal interact with a short range wireless communication sensor;
   detecting, through at least said mobile terminal, a movement of said mobile terminal through detecting means following said interaction;
   reading, from short range wireless communication sensor and through said mobile terminal, association information between an operation and a movement of said mobile terminal that is stored in said short range wireless communication sensor,
   adding, by the mobile terminal, a mobile terminal identifier as a unique identifier of itself to said association information,
   providing an actuator adapted to carry out at the operation at the reception of a specific command and driven by a remote electronic device operatively coupled to said mobile terminal;
   controlling, through control means of said mobile terminal, the operation based on said movement of said mobile terminal and said interaction with said short range wireless communication sensor, by
   storing, in the remote electronic device, a table which maps said mobile terminal identifier to operations said mobile terminal is allowed to carry out;
   sending wirelessly a specific command from said mobile terminal to the remote electronic device together with said mobile terminal identifier and said association information;
   checking, through the remote electronic device, whether the mobile terminal identifier is present in the table and whether the mobile terminal is authorized to perform said operation, and, in a positive case, making said actuator perform said operation.

14. The method according to claim 13, wherein said method provides the step of further controlling said operation based on said movement of said mobile terminal through second control means present in at least a remote controller operatively connected to said mobile terminal.

15. The method according to claim 13, wherein said method provides that the implementation of said operation depends from the performance of said movement of said mobile terminal within a predetermined time period starting from said interaction.

16. A mobile terminal comprising a mobile or cell phone, a smartphone, a badge or a credit card provided with at least a short range communication circuit, means for detecting movement and control means for implementing the method according to claim 13.

17. A non-transitory computer readable medium comprising computer executable instructions that, when executed, cause a mobile electronic device to implement the method according to claim 13.

18. A mobile terminal comprising a mobile or cell phone, a smartphone, a badge or a credit card provided with at least a short range communication circuit, means for detecting movement and control means for implementing the method according to claim 14.

19. A mobile terminal comprising a mobile or cell phone, a smartphone, a badge or a credit card provided with at least a short range communication circuit, means for detecting movement and control means for implementing the method according to claim 15.

* * * * *